(12) United States Patent
Martinez

(10) Patent No.: US 11,314,967 B2
(45) Date of Patent: Apr. 26, 2022

(54) SYSTEM AND METHOD FOR RECOGNITION AND ANNOTATION OF FACIAL EXPRESSIONS

(71) Applicants: Aleix Martinez, Columbus, OH (US); OHIO STATE INNOVATION FOUNDATION, Columbus, OH (US)

(72) Inventor: Aleix Martinez, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 300 days.

(21) Appl. No.: 16/306,323

(22) PCT Filed: Jun. 1, 2017

(86) PCT No.: PCT/US2017/035502
§ 371 (c)(1),
(2) Date: Nov. 30, 2018

(87) PCT Pub. No.: WO2017/210462
PCT Pub. Date: Dec. 7, 2017

(65) Prior Publication Data
US 2019/0294868 A1    Sep. 26, 2019

Related U.S. Application Data

(60) Provisional application No. 62/343,994, filed on Jun. 1, 2016.

(51) Int. Cl.
*G06K 9/00*           (2006.01)
*G06N 3/08*           (2006.01)

(52) U.S. Cl.
CPC ..... *G06K 9/00308* (2013.01); *G06K 9/00275* (2013.01); *G06K 9/00281* (2013.01); *G06N 3/08* (2013.01)

(58) Field of Classification Search
CPC .......... G06K 9/00275; G06K 9/00268; G06K 9/00281; G06K 9/00288; G06K 9/00295;
(Continued)

(56) References Cited

U.S. PATENT DOCUMENTS 5,293,427 A * 3/1994 Ueno ................. G06K 9/00268
                                                              382/103
10,810,409 B2 * 10/2020 Bacivarov ............... G06K 9/52
(Continued)

OTHER PUBLICATIONS

Garrido, P., Zollhöfer, M., Casas, D., Valgaerts, L., Varanasi, K., Pérez, P., et al. (2016). Reconstruction of Personalized 3D Face Rigs from Monocular Video. ACM Transactions on Graphics, 35(3): 28. doi:10.1145/2890493. (Year: 2016).*

(Continued)

*Primary Examiner* — Sean M Conner
*Assistant Examiner* — Stephen M Brinich
(74) *Attorney, Agent, or Firm* — James J. Pingor

(57) ABSTRACT

The innovation disclosed and claimed herein, in aspects thereof, comprises systems and methods of identifying AUs and emotion categories in images. The systems and methods utilized a set of images that include facial images of people. The systems and methods analyze the facial images to determine AUs and facial color due to facial blood flow variations that are indicative of an emotion category. In aspects, the analysis can include Gabor transforms to determine the AUs, AU intensities and emotion categories. In other aspects, the systems and method can include color variance analysis to determine the AUs, AU intensities and emotion categories. In further aspects, the analysis can include deep neural networks that are trained to determine the AUs, emotion categories and their intensities.

12 Claims, 8 Drawing Sheets

(a)

(b)

(58) Field of Classification Search
CPC ..... G06K 9/00315; G06K 2009/00322; G06K 2009/00328; G06N 3/08
USPC .................. 382/115–118, 195, 203–204, 274
See application file for complete search history.

(56) References Cited

U.S. PATENT DOCUMENTS

| | | | |
|---|---|---|---|
| 2004/0017932 | A1 | 1/2004 | Yang |
| 2008/0273765 | A1* | 11/2008 | Tsujimura .......... G06K 9/00315 382/118 |
| 2009/0257654 | A1* | 10/2009 | Roizen .................. G06Q 50/22 382/190 |
| 2011/0007174 | A1 | 1/2011 | Bacivarov et al. |
| 2011/0222742 | A1* | 9/2011 | Stein .................... G06K 9/4661 382/118 |
| 2012/0140091 | A1* | 6/2012 | Irmatov ................. G06T 7/586 348/222.1 |
| 2017/0364738 | A1* | 12/2017 | Wang ..................... G06T 7/337 |

OTHER PUBLICATIONS

Y. Lee, W. Han and Y. Kim, "Emotional Recognition from Facial Expression Analysis Using Bezier Curve Fitting," 2013 16th International Conference on Network-Based Information Systems, 2013, pp. 250-254, doi: 10.1109/NBiS.2013.39. (Year: 2013).*

A. De and A. Saha, "A comparative study on different approaches of real time human emotion recognition based on facial expression detection," 2015 International Conference on Advances in Computer Engineering and Applications, 2015, pp. 483-487, doi: 10.1109/ICACEA.2015.7164792. (Year: 2015).*

Mahoor, et al. "A Framework for Automated Measurement of the Intensity of Non-Posed Facial Action Units" Computer Vision and Pattern Recognition Workshops, 2009 CVPR Workshops 2009. IEEE Computer Society Conference; Publication Jun. 2009 [online]. Retrieved Aug. 15, 2017 from <URL: https://pdfs.semanticscholar.org/1876/9a58de23c46d2bb0f1d1347f3aa33d800293.pdf>; pp. 1-7; abstract only.

Nicolle, et al. "Facial Action Unit Intensity Prediction via Hard Multi-Task Metric Learning for Kernel Regression" Automatic Face and Gesture Recognition (FG), 2015, 11th IEEE International Conference and Workshops; Publication May 2015 [online]. Retrieved Aug. 15, 2017 from <URL: http://www.isir.upmc.fr/files/2015ACTTI3409.pdf>; pp. 1-6.

Written Opinion of the International Searching Authority for International Patent Application No. PCT/US17/35502 dated Sep. 29, 2017; 5 pages.

International Search Report for International Patent Application No. PCT/US17/35502 dated Sep. 29, 2017; 4 pages.

Extended (Supplementary) European Search Report And Search Opinion, European Patent Office, dated Apr. 2, 2020, for Application No. PCT/US2017035502.

Shashank Jaiswal, Michel Valstar, Deep Learning the Dynamic Appearance and Shape of Facial Action Units, 2016 IEEE Winter Conference on Applications of Computer Vision (WACV), IEEE, Mar. 7, 2016, pp. 1-8.

Hsu Fu-Song et al., Automatic Facial Expression Recognition for Affective Computing Based on Bag of Distances, 2013 Asia-Pacific Signal and Information Processing Association Annual Summit and Conference, APSIPA, Oct. 29, 2013, pp. 1-4.

Tingfan Wu et al., Multi-Layer Architectures for Facial Action Unit Recognition, Jan. 1, 2012, URL: http://mplab.ucsd.edu/~marni/pubs/Wu_SMC_2012.pdf.

S. Du et al., Compound facial expressions of emotion, Proceedings of The National Academy of Sciences, vol. 111, No. 15, Mar. 31, 2014, pp. E1454-E1462.

* cited by examiner

| | Number of images | |
|---|---|---|
| Query by emotion | | Retrieved images |
| Happiness | 35,498 | |
| Fear | 2,462 | |
| Query by Action Units | Number of Images | Retrieved images |
| AU 4 | 281,732 | |
| AU 6 | 267,660 | |
| Query by keyword | Number of images | Retrieved images |
| Anxiety | 708 | |
| Disapproval | 2,096 | |

FIG. 1

SYSTEM AND METHOD FOR RECOGNITION AND ANNOTATION OF FACIAL EXPRESSIONS

CROSS REFERENCE TO RELATED APPLICATIONS

This application claims the benefit of and priority to pending PCT Application Serial Number PCT/US17/35502 entitled "SYSTEM AND METHOD FOR RECOGNITION AND ANNOTATION OF FACIAL EXPRESIONS," filed Jun. 1, 2017, which claims the benefit of and priority to U.S. Provisional Patent Application Ser. No. 62/343,994 entitled "SYSTEM AND METHOD FOR RECOGNITION OF ANNOTATION OF FACIAL EXPRESSIONS" filed Jun. 1, 2016. The entirety of the above-noted applications are incorporated by reference herein.

GOVERNMENT LICENSE RIGHTS

This invention was made with government support under Grant No. R01-EY-020834 and R01-DC-014498 awarded by the National Eye Institute and the National Institute of Deafness and Other Communicative Disorders; both institutes are part of the National Institutes of Health. The government has certain rights in the invention.

BACKGROUND

Basic research in face perception and emotion theory can leverage large annotated databases of images and video sequences of facial expressions of emotion. Some of the most useful and typically needed annotations are Action Units (AUs), AU intensities, and emotion categories. While small and medium size databases can be manually annotated by expert coders over several months, large databases cannot. For example, even if it were possible to annotate each face image very fast by an expert coder (say, 20 seconds/image), it would take 5,556 hours to code a million images, which translates to 694 (8 hour) working days or 2.66 years of uninterrupted work.

Existing algorithms either do not recognize all the AUs for all applications, do not specify AU intensity, are too computational demanding in space and/or time to work with large databases, or are only tested within specific databases (e.g., even when multiple databases are used, training and testing is generally done within each database independently).

SUMMARY

The present disclosure provides a computer vision and machine learning process for the recognition of action units (AUs), their intensities, and a large number (23) of basic and compound emotion categories across databases. Crucially, the exemplified process is the first to provide reliable recognition of AUs and their intensities across databases and runs in real-time (>30 images/second). The capabilities facilitate the automatic annotations of a large database of a million facial expressions of emotion images "in the wild," a feat not attained by any other system.

Additionally, images are annotated semantically with 421 emotion keywords.

A computer vision process for the recognition of AUs and AU intensities in images of faces is presented. Among other things, the instant process can reliably recognize AUs and AU intensities across databases. It is also demonstrated herein that the instant process can be trained using several databases to successfully recognize AUs and AU intensities on an independent database of images not used to train our classifiers. In addition, the instant process is used to automatically construct and annotate a large database of images of facial expressions of emotion. Images are annotated with AUs, AU intensities and emotion categories. The result is a database of a million images that can be readily queried by AU, AU intensity, emotion category and/or emotive keyword.

In addition, the instant process facilitates a comprehensive computer vision processes for the identification of AUs from color features. To this end, color features can be successfully exploited for the recognition of AU, yielding results that are superior to those obtained with the previous mentioned system. That is, the functions defining color change as an AU goes from inactive to active or vice-versa are consistent within AUs and differential between them. In addition, the instant process reveals how facial color changes can be exploited to identify the presence of AUs in videos filmed under a large variety of image conditions.

Additionally, facial color is used to determine the emotion of the facial expression. As described above, facial expressions of emotion in humans are produced by contracting one's facial muscles, generally called Action Units (AUs). Yet, the surface of the face is also innervated with a large network of blood vessels. Blood flow variations in these vessels yield visible color changes on the face. For example, anger increases blood flow to the face, resulting in red faces, whereas fear is associated with the drainage of blood from the face, yielding pale faces. These visible facial colors allow for the interpret of emotion in images of facial expressions even in the absence of facial muscle activation. This color signal is independent from that provided by AUs, allowing our algorithms to detect emotion from AUs and color independently.

In addition, a Global-Local loss function for Deep Neural Networks (DNNs) is presented that can be efficiently used in fine-grained detection of similar object landmark points of interest as well as AUs and emotion categories. The derived local and global loss yields accurate local results without the need to use patch-based approaches and results in fast and desirable convergences. The instant Global-Local loss function may be used for the recognition of AUs and emotion categories.

In some embodiments, the facial recognition and annotation processes are used in clinical applications.

In some embodiments, the facial recognition and annotation processes are used in detection of evaluation of psychopathologies.

In some embodiments, the facial recognition and annotation processes are used in screening for post-traumatic stressed disorder. e.g., in a military setting or an emergency room.

In some embodiments, the facial recognition and annotation processes are used for teaching children with learning disorders (e.g., Autism Spectrum Disorder) to recognize facial expressions.

In some embodiments, the facial recognition and annotation processes are used for advertising, e.g., for analysis of people looking at ads; for analysis of people viewing a movie; for analysis of people's responses in sport arenas.

In some embodiments, the facial recognition and annotation processes are used for surveillance.

In some embodiments, the recognition of emotion, AUs and other annotations are used to improve or identify web searches, e.g., the system is used to identify images of faces expressing surprise or the images of a particular person with furrowed brows.

In some embodiments, the facial recognition and annotation processes are used in retail to monitor, evaluate or determine customer behavior.

In some embodiments, the facial recognition and annotation processes are used to organize electronic pictures of an institution or individual, e.g., organize the personal picture of a person by emotion or AUs.

In some embodiments, the facial recognition and annotation processes are used to monitor patients' emotions, pain and mental state in a hospital or clinical setting, e.g., to determine the level of discomfort of a patient.

In some embodiments, the facial recognition and annotation process are used to monitor a driver's behavior and attention to the road and other vehicles.

In some embodiments, the facial recognition and annotation process are used to automatically select emoji, stickers or other texting affective components.

In some embodiments, the facial recognition and annotation process are used to improve online surveys. e.g., to monitor emotional responses of online survey participants.

In some embodiments, the facial recognition and annotation process are used in online teaching and tutoring.

In some embodiments, the facial recognition and annotation process are used to determine the fit of a job application is a specific company, e.g., a company may be looking for attentive participants, whereas another may be interested in joyful personalities. In another example, the facial recognition and annotation process are used to determine the competence of an individual during a job interview or on an online video resume.

In some embodiments, the facial recognition and annotation process are used in gaming.

In some embodiments, the facial recognition and annotation process are used to evaluate patients' responses in a psychiatrist office, clinic or hospital.

In some embodiments, the facial recognition and annotation process is used to monitor babies and children.

In an aspect, a computer-implemented method is disclosed (e.g., for analyzing an image to determine AU and AU intensity, e.g., in real-time). The method comprises maintaining, in memory (e.g., persistent memory), one or a plurality of kernel vector spaces (e.g., kernel vector space) of configural or other shape features and of shading features, wherein each kernel space is associated with one or several action units (AUs) and/or an AU intensity value and/or emotion category; receiving an image (e.g., an image of a facial expressions externally or from one or multiple databases) to be analyzed; and for each received image: i) determining face space data (e.g., face vector space) of configural, shape and shading features of a face in the image (e.g., wherein the face space includes a shape feature vector of the configural features and a shading feature vector associated with shading changes in the face); and ii) determining one or more AU values for the image by comparing the determined face space data of configural features to the plurality of kernel spaces to determine presence AUs, AU intensities and emotion categories.

In some embodiments, the method includes processing, in real-time, a video stream comprising a plurality of images to determine AU values and AU intensity values for each of the plurality of images.

In some embodiments, the face space data includes a shape feature vector of the configural features and a shading feature vector associated with shading changes in the face.

In some embodiments, the determined face space of the configural, shape and shading features comprises i) distance values (e.g., Euclidean distances) between normalized landmarks in Delaunay triangles formed from the image and ii) distances, areas and angles defined by each of the Delaunay triangles corresponding to the normalized facial landmarks.

In some embodiments, the shading feature vector associated with shading changes in the face are determined by: applying Gabor filters to normalized landmark points determined from the face (e.g., to model shading changes due to the local deformation of the skin).

In some embodiments, the shape feature vector of the configural features comprises landmark points derived using a deep neural network (e.g., a convolution neural network, DNN) comprising a global-local (GL) loss function configured to backpropagate both local and global fit of landmark points projected and/or AUs and/or emotion categories over the image.

In some embodiments, the method includes for each received image: i) determining a face space associated with a color features of the face; and ii) determining one or more AU values for the image by comparing this determined color face space to the plurality of color or kernel vector spaces, iii) modify the color of the image such that the face appears to express a specific emotion or have one or more AUs active or at specific intensities.

In some embodiments, the AU value and AU intensity value, collectively, define an emotion and an emotion intensity.

In some embodiments, the image comprises a photograph.

In some embodiments, the image comprises a frame of a video sequence.

In some embodiments, the image comprises an entire video sequence.

In some embodiments, the method includes receiving an image of a facial expression in the wild (e.g., the Internet); and processing the received image to determine an AU value and an AU intensity value and an emotion category for a face in the received image.

In some embodiments, the method includes receiving a first plurality of images from a first database; receiving a second plurality of images from a second database: and processing the received first plurality and second plurality of images to determine for each image thereof an AU value and an AU intensity value for a face in each respective image, wherein the first plurality of images has a first captured configuration and the second plurality of images has a second captured configuration, wherein the first captured configuration is different form the second captured configuration (e.g., wherein captured configuration includes lighting scheme and magnitude; image background; focal plane; capture resolution; storage compression level; pan, tilt, and yaw of the capture relative to the face, etc.).

In another aspect, a computer-implemented method is disclosed (e.g., for analyzing an image to determine AU, AU intensity and emotion category using color variation in the image). The method includes identify changes defining transition of an AU from inactive to active, wherein the changes are selected from the group consisting of chromaticity, hue and saturation, and luminance; and applying Gabor transform to the identified chromaticity changes (e.g., to gain invariance to the timing of this change during a facial expression).

In another aspect, a computer-implemented method is disclosed for analyzing an image to determine AU and AU intensity. The method includes maintaining, in memory (e.g., persistent memory), a plurality of color features data associated with an AU and/or AU intensity; receiving an image to be analyzed; and for each received image: i) determining configural color features of a face in the image: and ii) determining one or more AU values for the image by comparing the determined configural color features to the plurality of trained color feature data to determine presence of the determined configural color features in one of more of the plurality of trained color feature data.

In another aspect, a computer-implemented method is disclosed (e.g., for generating a repository of plurality of face space data each associated with an AU value and an AU intensity value, wherein the repository is used for the classification of face data in an image or video frame for AU and AU intensity). The method includes analyzing a plurality of faces in images or video frames to determine kernel space data for a plurality of AU values and AU intensity values, wherein each kernel space data is associated with a single AU value and a single AU intensity value, and wherein each kernel space is linearly or non-linearly separable to other kernel face space.

In some embodiments, the step of analyzing the plurality of faces to determine kernel space data comprises: generating a plurality of training set of AUs for a pre-defined number of AU intensity values; and performing kernel subclass discriminant analysis to determine a plurality of kernel spaces, each of the plurality of kernel spaces corresponding to kernel vector data associated with a given AU value, AU intensity value, an emotion category and the intensity of that emotion.

In some embodiments, the kernel space includes functional color space feature data of an image or a video sequence.

In some embodiments, the functional color space is determined by performing a discriminant functional learning analysis (e.g., using a maximum-margin functional classifier) on color images each derived from a given image of plurality of images.

In another aspect, a non-transitory computer readable medium is disclosed. The computer readable medium has instructions stored thereon, wherein the instructions, when executed by a processor, cause the processor to perform any of the methods described above.

In another aspect, a system is disclosed. The system comprises a processor and computer readable medium having instructions stored thereon, wherein the instructions, when executed by a processor, cause the processor to perform any of the methods described above.

BRIEF DESCRIPTION OF THE DRAWINGS

FIG. 1 is a diagram illustrating the output of a computer vision process to automatically annotate emotion categories and AUs in face images in the wild.

FIGS. 2A and 2B, is an illustration of detected face landmarks and a Delaunay triangulation of an image.

DETAILED DESCRIPTION

Real-Time Algorithm for the Automatic Annotation of a Million Facial Expressions in the Wild FIG. 1 depicts a resulting database of facial expressions that can be readily queried (e.g. sorted, organized, and/or the like) by AU, AU intensity, emotion category, or emotion/affect keyword. The database facilitates the design of new computer vision algorithms as well as basic, translational and clinical studies in social and cognitive psychology, social and cognitive neuroscience, neuro-marketing, psychiatry, and/or the like.

The database is compiled of outputs of a computer vision system that automatically annotates emotion category and AU in face images in the wild (i.e. images not already curated in an existing database). The images can be downloaded using a variety of web search engines by selecting only images with faces and with associated emotion keywords in WordNet or other dictionary. FIG. 1 shows three example queries of the database. The top example is the results of two queries obtained when retrieving all images that have been identified as happy and fearful. Also shown is the number of images in the database of images in the wild that were annotated as either happy or fearful. The third depicted query shows the results of retrieving all images with AU 4 or 6 present, and images with the emotive keyword "anxiety" and "disapproval."

AU and Intensity Recognition

In some embodiments, the system for recognizing AUs may process at over 30 images/second and is determined to be highly accurate across databases. The system achieves high recognition accuracies across databases and can run in real time. The system can facilitate categorizing facial expressions within one of twenty-three basic and/or compound emotion categories. Categorization of emotion is given by the detected AU pattern of activation. In some embodiments, an image(s) may not belong to one of the 23 categories. When this is the case, the image is annotated with AUs without an emotion category. If an image does not have any AU active, the image is classified as a neutral expression. In addition to determining emotions and emotion intensities in faces, the exemplified processes maybe used to identify the "not face" in an image.

Face Space for AU and Intensity Recognition

The system starts by defining a feature space employed to represent AUs in face images. Perception of faces, and facial expressions in particular, by humans is known to involve a combination of shape and shading analyses. The system can define shape features that facilitate perception of facial expressions of emotion. The shape features can be second-order statistics of facial landmarks (i.e., distances and angles between landmark points in the face image). The features can alternatively be called configural features, because the features define the configuration of the face. It is appreciated that the terms may be used interchangeable in this application.

Figure 2:
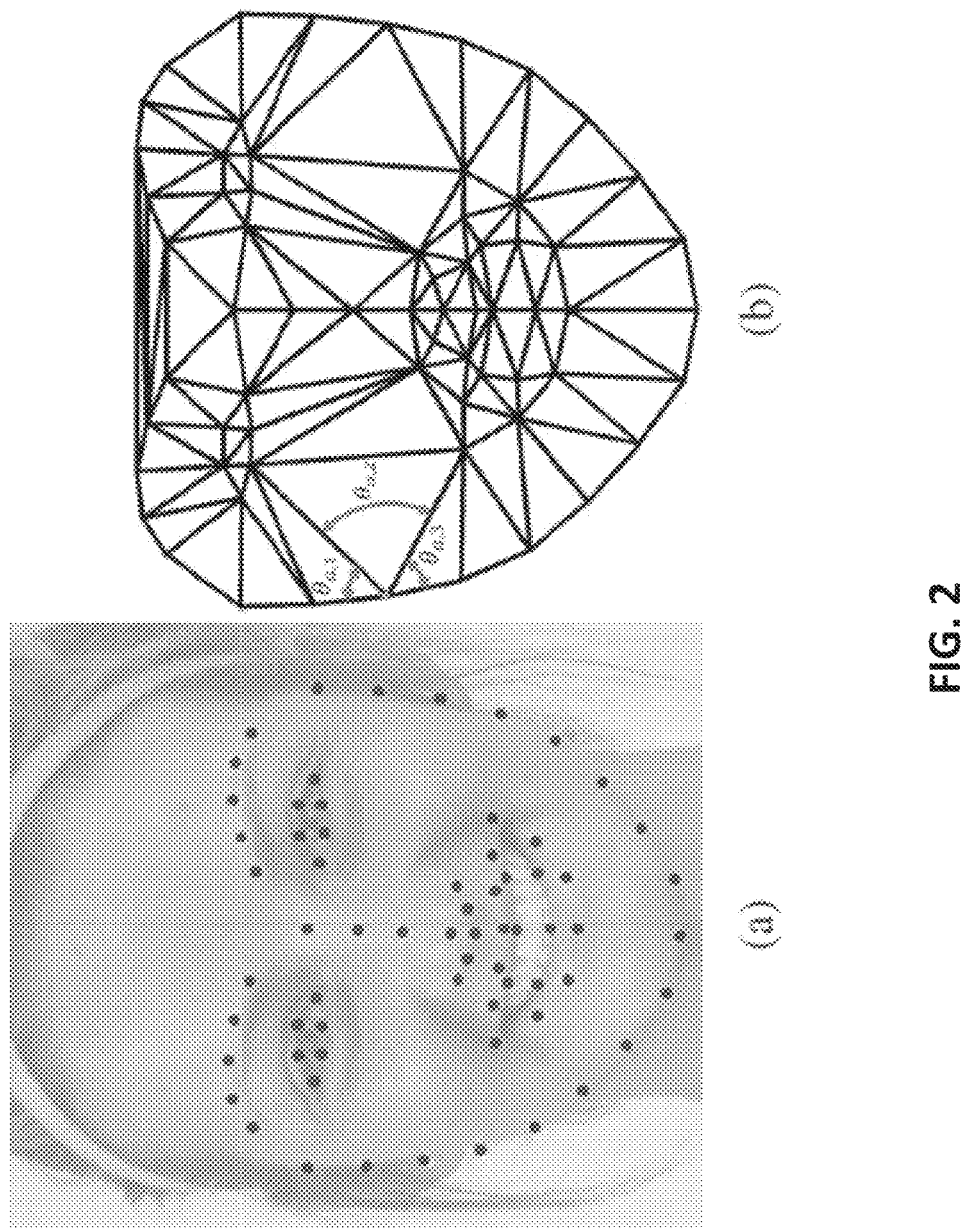
FIG. 2, comprising

FIG. 2(a) shows examples of normalized face landmarks $\hat{S}_{ij}$ (j=1, . . . , 66) used by the proposed algorithm, several (e.g., fifteen) of the landmarks can correspond to anatomical landmarks (e.g., corners of the eyes, mouth, eyebrows, tip of the nose, and chin). Other landmarks can be pseudo-landmarks defining the edge of the eyelids, mouth, brows, lips and jaw line as well as the midline of the nose going from the tip of the nose to the horizontal line given by the center of the two eyes. The number of pseudo-landmarks defining the contour of each facial component (e.g., brows) is constant, which provides equivalency of landmark position for different faces or people.

FIG. 2(b) shows a Delaunay triangulation performed by the system. In this example, the number of triangles in this configuration is 107. Also shown in the image are the angles of the vector $\theta_a = (\theta_{a1}, \ldots, \theta_{aq_a})^T$ (with $q_a=3$), which define the angles of the triangles emanating from the normalized landmark $\hat{s}_{ija}$.

$S_{ij} = (s_{ij1}^T, \ldots, s_{ijp}^T)$ can be a vector of landmark points in the $j^{th}$ sample image ($j=1, \ldots, n_i$) of AU i, where $s_{ijk} \in R^2$ are the 2D image coordinates of the $k^{th}$ landmark, and $n_i$ is the number of sample images with AU i present. In some embodiments, the face landmarks can be obtained with computer vision algorithms. For example, the computer vision algorithms can be used to automatically detect any number of landmarks (for example 66 detected landmarks in a test image) as shown in FIG. 2a, where $s_{ijk} \in R^{132}$ when the number of landmark points is 66.

The training images can be normalized to have the same inter-eye distance of $\tau$ pixels. Specifically, $\hat{s}_{ijk} = c \, s_{ij}$, where $c = \tau/\|l-r\|_2$, l, and r are the image coordinates of the center of the left and right eye, $\|.\|_2$ defines the 2-norm of a vector, $\hat{s}_{ij} = (\hat{s}_{ij1}^T, \ldots, \hat{s}_{ijp}^T)$ and $\tau = 300$. The location of the center of each eye can be readily computed as the geometric mid-point between the landmarks defining the two corners of the eye.

The shape feature vector of configural features can be defined as, $$x_{ij} = (d_{ij12}, \ldots, d_{ijp-1\,p}, \theta_1^T, \ldots, \theta_p^T)^T \quad \text{(Eqn. 1)}$$

where $d_{ijab} = \|\hat{s}_{ija}^T - \hat{s}_{ijb}^T\|_2$ are the Euclidean distances between normalized landmarks, $a=1, \ldots, p-1$, $b=a+1$, p and $\theta_a = (\theta_{a1}, \ldots, \theta_{aq_a})^T$ are the angles defined by each of the Delaunay triangles emanating from the normalized landmark $\hat{s}_{iji}$, with $q_a$ the number of Delaunay triangles originating at $\hat{s}_{ija}$ and $\Sigma_{k=1}^{q_a} \theta_{ak} \leq 360°$ (the equality holds for non-boundary landmark points). Since each triangle in this figure can be defined by three angles and in this example, there are 107 triangles, the total number of angles in our shape feature vector is 321. The shape feature vectors can be $$x_{ij} \in R^{\frac{p(p-1)}{2}+3t},$$

where p is the number of landmarks and t the number of triangles in the Delaunay triangulation. In this example, with p=66 and t=107, vectors $x_{ij} \in R^{2,466}$.

The system can employ Gabor filters that are centered at each of the normalized landmark points $\hat{s}_{ijk}$ to model shading changes due to the local deformation of the skin. When a facial muscle group deforms the skin of the face locally, the reflectance properties of the skin change (e.g. the skin's bidirectional reflectance distribution function is defined as a function of the skin's wrinkles because this changes the way light penetrates and travels between the epidermis and the dermis and may also vary hemoglobin levels) as well as foreshortening the light source as seen from a point on the surface of the skin.

Cells in early visual cortex in humans can be modelled by the system using the Gabor filters. Face perception can use Gabor-like modeling to gain invariance to shading changes such as those seen when expressing emotions. It can be defined as $$g(\hat{s}_{ijk}; \lambda, \alpha, \phi, \gamma) = \exp\left(\frac{s_1^2 + \gamma^2 s_2^2}{2\sigma^2}\right) \cos\left(2\pi \frac{s_1}{\lambda} + \phi\right), \quad (2)$$

with $\hat{s}_{ijk} = (\hat{s}_{ijk1}, \hat{s}_{ijk2})^T$, $s_1 = \hat{s}_{ijk1} \cos \alpha + \hat{s}_{ijk2} \sin \alpha$, $s_2 = -\hat{s}_{ijk1} \sin \alpha + \hat{s}_{ijk2} \cos \alpha$, $\lambda$ the wavelength (i.e., number of cycles/pixel), $\alpha$ the orientation (i.e., the angle of the normal vector of the sinusoidal function), $\phi$ the phase (i.e., the offset of the sinusoidal function), $\gamma$ the (spatial) aspect ratio, and $\sigma$ the scale of the filter (i.e., the standard deviation of the Gaussian window).

In some embodiments, a Gabor filter bank can be used with o orientations, s spatial scales, and r phases. In an example Gabor filter, the following are set: $\lambda = \{4, 4\sqrt{2}, 4\times 2, 4(2\sqrt{2}), 4(2\times 2)\} = \{4, 4\sqrt{2}, 8, 8\sqrt{2}, 16\}$ and $\gamma = 1$. The values are appropriate to represent facial expressions of emotion. The values of o, s, and r are learned using cross-validation on the training set. The following set are possible values $\alpha = \{4,6,8,10\}$, $\sigma = \{\lambda/4, \lambda/2, 3\lambda/4, \lambda\}$ and $\phi = \{0, 1, 2\}$ and use 5-fold cross-validation on the training set to determine which set of parameters best discriminates each AU in our face space.

$I_{ij}$ is the $j^{th}$ sample image with AU i present and defined as $$g_{ijk} = (g(\hat{s}_{ijk}; \lambda_1, \alpha_1, \phi_1, \gamma) * I_{ij},$$

$$g(\hat{s}_{iji}; \lambda_s, \alpha^o, \phi_r, \gamma) * I_{ij})^T, \quad (3)$$

as the feature vector of Gabor responses at the $k^{th}$ landmark points, where * defines the convolution of the filter g(.) with the image $I_{ij}$, and $\lambda_k$ is the $k^{th}$ element of the set $\lambda$ defined above; the same applies to $\alpha_k$ and $\phi_k$, but not to $\gamma$ since this is generally 1.

The feature vector of the Gabor responses on all landmark points for the $j^{th}$ sample image with AU i active are defined as:

$$g_{ij} = (g_{ij1}^T, \ldots, g_{ijp}^T)^T \quad (4)$$

The feature vectors define the shading information of the local patches around the landmarks of the face and their dimensionality is $g_{ij} \in R^{s \times p \times o \times x \times r}$.

The final feature vectors defining the shape and shading changes of AU i in face space are defined as $$z_{ij} = (x_{ij}^T, g_{ij}^T)^T, j=1, \ldots, n_i. \quad (5)$$

Classification in Face Space for AU and Intensity Recognition

The system can define the training set of AU i as $$D_i = \{(z_{i1}, y_{i1}), \ldots, (z_{i\,n_i}, y_{i\,n_i}), z_{i\,n_i+1}, y_{i\,n_i+1}), \ldots,$$
$$(z_{i\,n_i+m_i}, y_{i\,n_i+m_i})\} \quad (6)$$

where $y_{ij} = 1$ for $j=1, \ldots, n_k$, indicating that AU i is present in the image, $y_{ij} = 0$ for $j = n_i+1, \ldots, n_i+m_i$, indicating that AU i is not present in the image, and $m_i$ is the number of sample images that do not have AU i active.

The training set above is also ordered as follows. The set $$D_i(a) = \{(z_{i1}, y_{i1}), \ldots, (z_{i\,n_{ia}}, y_{i\,n_{ia}})\} \quad (7)$$

includes the $n_{ia}$ samples with AU i active at intensity a (that is the lowest intensity of activation of an AU), the set $$\mathcal{T}_i(b) = \{(z_{i\,n_{ia}+1}, y_{i\,n_{ia}+1}), \ldots, (z_{i\,n_{ia}+n_{ib}}, y_{i\,n_{ia}+n_{ia}})\} \quad (8)$$

are the $n_{ib}$ samples with AU i active at intensity b (which is the second smallest intensity).

The set:

$$\mathcal{T}_i(c) = \{(z_{i\,n_{ia}+n_{ib}+1}, y_{i\,n_{ia}+n_{ib}+1}), \ldots, (z_{i\,n_{ia}+n_{ib}+n_{ic}}, y_{i\,n_{ia}+n_{ib}+n_{ic}})\} \quad (9)$$

are the $n_{ic}$ samples with AU i active at intensity c (which is the next intensity).

The set:

$$\mathcal{D}_i(d) = \{(z_{i\ n_{ia}+n_{ib}+n_{ic}+1}, y_{i\ n_{ia}+n_{ib}+n_{ic}+1}), \ldots, (z_{i\ n_{ia}+n_{ib}+n_{ic}+n_{id}}, y_{i\ n_{ia}+n_{ib}+n_{ic}+n_{id}})\} \quad (10)$$

are the $n_{id}$ samples with AU i active at intensity d (which is the highest intensity), and $n_{ia}+n_{ib}+n_{ic}+n_{id}=n_i$.

An AU can be active at five intensities, which can be labeled a, b, c, d, or e. In some embodiments, there are rare examples with intensity e and, hence, in some embodiments, the four other intensities are sufficient. Otherwise, $D_i(e)$ defines the fifth intensity.

The four training sets defined above are subsets of $D_i$ and can be represented as different subclasses of the set of images with AU i active. In some embodiments, a subclass-based classifier can be used. In some embodiments, the system utilizes Kernel Subclass Discriminant Analysis (KSDA) to derive instant processes. KSDA can be used because it can uncover complex non-linear classification boundaries by optimizing the kernel matrix and number of subclasses. The KSDA can optimize a class discriminant criterion to separate classes optimally. The criterion is formally given by $Q_i(\phi_i, h_{i1}, h_{i2}) = Q_{i1}(\phi_i, h_{i1}, h_{i2}) Q_{i2}(\phi_i, h_{i1}, h_{i2})$, with $Q_{i1}(\phi_i, h_{i1}, h_{i2})$ responsible for maximizing homoscedasticity. The goal of the kernel map is to find a kernel space F where the data is linearly separable, in some embodiments, the subclasses can be linearly separable in F, which is the case when the class distributions share the same variance, and $Q_{i2}(\phi_i, h_{i1}, h_{i2})$ maximizes the distance between all subclass means (i.e., which is used to find the Bayes classifier with smallest Bayes error).

To see this recall that the Bayes classification boundary is given in a location of feature space where the probabilities of the two Normal distributions are identical (i.e., $p(z|N(\mu_1, \Sigma_1)) = p(z|N(\mu_2, \Sigma_2))$, where $N(\mu_i, \Sigma_i)$ is a Normal distribution with mean $\mu_i$ and covariance matrix $\Sigma_i$. Separating the means of two Normal distributions decreases the value where this equality holds, i.e., the equality $p(x|N(\mu_1, \Sigma_1)) = p(x|N(\mu_2, \Sigma_2))$ is given at a probability values lower than before and, hence, the Bayes error is reduced.

Thus, the first component of the KSDA criterion presented above is given by, $$Q_{i1}(\varphi_i, h_{i1}, h_{i2}) = \frac{1}{h_{i1} h_{i2}} \sum_{c=1}^{h_{i1}} \sum_{d=h_{i1}}^{h_{i1}+h_{i2}} \frac{tr(\sum_{ic}^{\varphi_i} \sum_{id}^{\varphi_i})}{tr(\sum_{ic}^{\varphi_i^2}) tr(\sum_{id}^{\varphi_i^2})} \quad (11)$$

where $\Sigma_{il}^{\varphi_i}$ is the subclass covariance matrix (i.e., the covariance matrix of the samples in subclass l) in the kernel space defined by the mapping function $\varphi_i(.): R^e \to F$, $h_{i1}$ is the number of subclasses representing AU i is present in the image, $h_{i2}$ is the number of subclasses representing AU i is not present in the image, and recall $e = 3t + p(p-1)/2 + 5 \times p \times o \times s \times r$ is the dimensionality of the feature vectors in the face space defined in Section relating to Face Space.

The second component of the KSDA criterion is, $$Q_{i2}(\varphi_i, h_{i1}, h_{i2}) = \sum_{c=1}^{h_{i1}} \sum_{d=h_{i1}+1}^{h_{i1}+h_{i2}} p_{ic} p_{id} \|\mu_{ic}^{\varphi_i} - \mu_{id}^{\varphi_i}\|_2^2, \quad (12)$$

where $p_{il} = n_l/n_i$ is the prior of subclass l in class i (i.e., the class defining AU i), $n_l$ is the number of samples in subclass l, and $\mu_{il}^{\varphi_i}$ is the sample mean of subclass l in class i in the kernel space defined by the mapping function $\varphi_i(.)$.

For example, the system can define the mapping functions $\phi_i(.)$ using the Radial Basis Function (RBF) kernel, $$k(z_{ij_1}, z_{ij_2}) = \exp\left(-\frac{\|z_{ij_1} - z_{ij_2}\|_2^2}{v_i}\right) \quad (13)$$

where $v_i$ is the variance of the RBF, and $j_1, j_2 = 1, \ldots, n_i + m_i$. Hence, the instant KSDA-based classifier is given by the solution to:

$$v_i^*, h_{i1}^*, h_{i2}^* = \arg\max_{v_i, h_{i1}, h_{i2}} Q_i(v_i, h_{i1}, h_{i2}) \quad (14)$$

Figure 3:
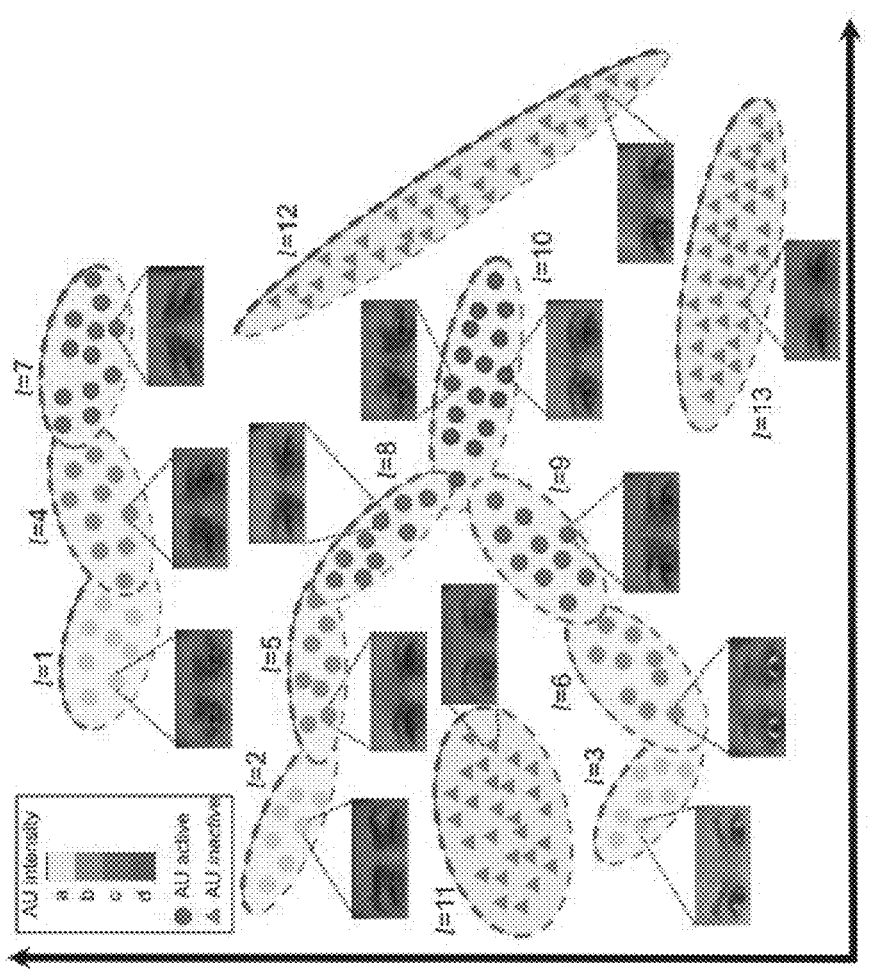
FIG. 3 is a diagram showing a hypothetical model in which sample images with active AUs are divided into subclasses.

FIG. 3 depicts a solution of the above equation to yield a model for AU i. In the hypothetical model shown above, the sample images with AU 4 active are first divided into four subclasses, with each subclass including the samples of AU 4 at the same intensity of activation (a-e). Then, the derived KSDA-based approach uses a process to further subdivide each subclass into additional subclasses to find the kernel mapping that intrinsically maps the data into a kernel space where the above Normal distributions can be separated linearly and are as far apart from each other as possible.

To do this, the system divides the training set D, into five subclasses. The first subclass (i.e., l=1) includes the sample feature vectors that correspond to the images with AU i active at intensity a, that is, the $D_i(a)$ defined in S. Du, Y. Tao, and A. M. Martinez. "Compound facial expressions of emotion" Proceedings of the National Academy of Sciences, 111(15):E1454-E1462, 2014, which is incorporated by reference herein in its entirety. The second subclass (l=2) includes the sample subset. Similarly, the third and fourth subclass (l=2, 3) include the sample subsets, respectively. Finally, the five subclass (l=5) includes the sample feature vectors corresponding to the images with AU i not active, i.e., $$\mathcal{D}_i(\text{not active}) = \{(z_{i\ n_i+1}, y_{i\ n_i+1}), \ldots, (z_{i\ n_i+m_i}, y_{i\ n_i+m_i})\}. \quad (15)$$

Thus, initially, the number of subclasses to define AU i active/inactive is five (i.e., $h_{i1}=4$ and $h_{i2}=1$). In some embodiments, this number can be larger: for example, if images at intensity e are considered.

Optimizing Equation 14 may yield additional subclasses. The derived approach optimizes the parameter of the kernel map $v_i$ as well as the number of subclasses $h_{i1}$ and $h_{i2}$. In this embodiment, the initial (five) subclasses can be further subdivided into additional subclasses. For example, when no kernel parameter $v_i$ can map the non-linearly separable samples in $D_i(a)$ into a space where these are linearly separable from the other subsets, $D_i(a)$ is further divided into two subsets $D_i(a) = \{D_i(a_1), D_i(a_2)\}$. This division is simply given by a nearest-neighbor clustering. Formally, let the sample $z_{ij+1}$ be the nearest-neighbor to $z_{ij}$, then the division of $D_i(a)$ is readily given by, $$\mathcal{D}_i(a_1) = \{(z_{i1}, y_{i1}), \ldots, (z_{i\ n_a/2}, y_{i\ n_a/2})\}$$

$$\mathcal{D}_i(a_2) = \{(z_{i\ n_a/2+1}, y_{i\ n_a/2+1}), \ldots, (z_{i n_a}, y_{i n_a})\} \quad (16)$$

The same applies to $D_i(b)$, $D_i(c)$, $D_i(d)$, $D_i(e)$ and $D_i$(not active). Thus, optimizing Equation 14 can result in multiple subclasses to model the samples of each intensity of activation or non-activation of AU i, e.g., if subclass one (l=1)

defines the samples in $D_i(a)$ and the system divides this into two subclasses (and currently $h_{i1}=4$), then the first new two subclasses will be used to define the samples in $D_i(a)$, with the first subclass ($l=1$) including the samples in $D_i(a_1)$ and the second subclass ($l=2$) those in $D_i(a_2)$ (and $h_{i1}$ will now be 5). Subsequent subclasses will define the samples in $D_i(b)$, $D_i(c)$, $D_i(d)$, $D_i(e)$ and $D_i$(not active) as defined above. Thus, the order of the samples as given in D, never changes with subclasses 1 through $h_{i1}$ defining the sample feature vectors associated to the images with AU i active and subclasses $h_{i1}+1$ through $h_{i1}+h_{i2}$ those representing the images with AU i not active. This end result is illustrated using a hypothetical example in FIG. 3.

In one example, every test image in a set of images $I_{test}$ can be classified. First, $I_{test}$ includes a feature representation in face space vector $z_{test}$ that is computed in relation to Face Space as described above. Second, the vector is projected into the kernel space and called $z^{\varphi}_{test}$. To determine if this image has AU i active, the system computes the nearest mean, $$j^* = \underset{j}{\operatorname{argmin}} \|z^{\varphi_i}_{test} - \mu^{\varphi_i}_{ij}\|_2, \ j=1, \ldots, h_{i1}+h_{i2} \qquad (17)$$

If $j^* \leq h_{i1}$, then $I_{test}$ is labeled as having AU i active; otherwise, it is not.

The classification result provides intensity recognition. If the samples represented by subclass l are a subset of those in $D_i(a)$, then the identified intensity is a. Similarly, if the samples of subclass l are a subset of those in $D_i(b)$, $D_i(c)$, $D_i(d)$ or $D_i(e)$, then the intensity of AU i in the test image $I_{test}$ is b, c, d and e, respectively. Of course, if $j^*>h_{i1}$, the images does not have AU i present and there is no intensity (or, one could say that the intensity is zero).

Figure 4:
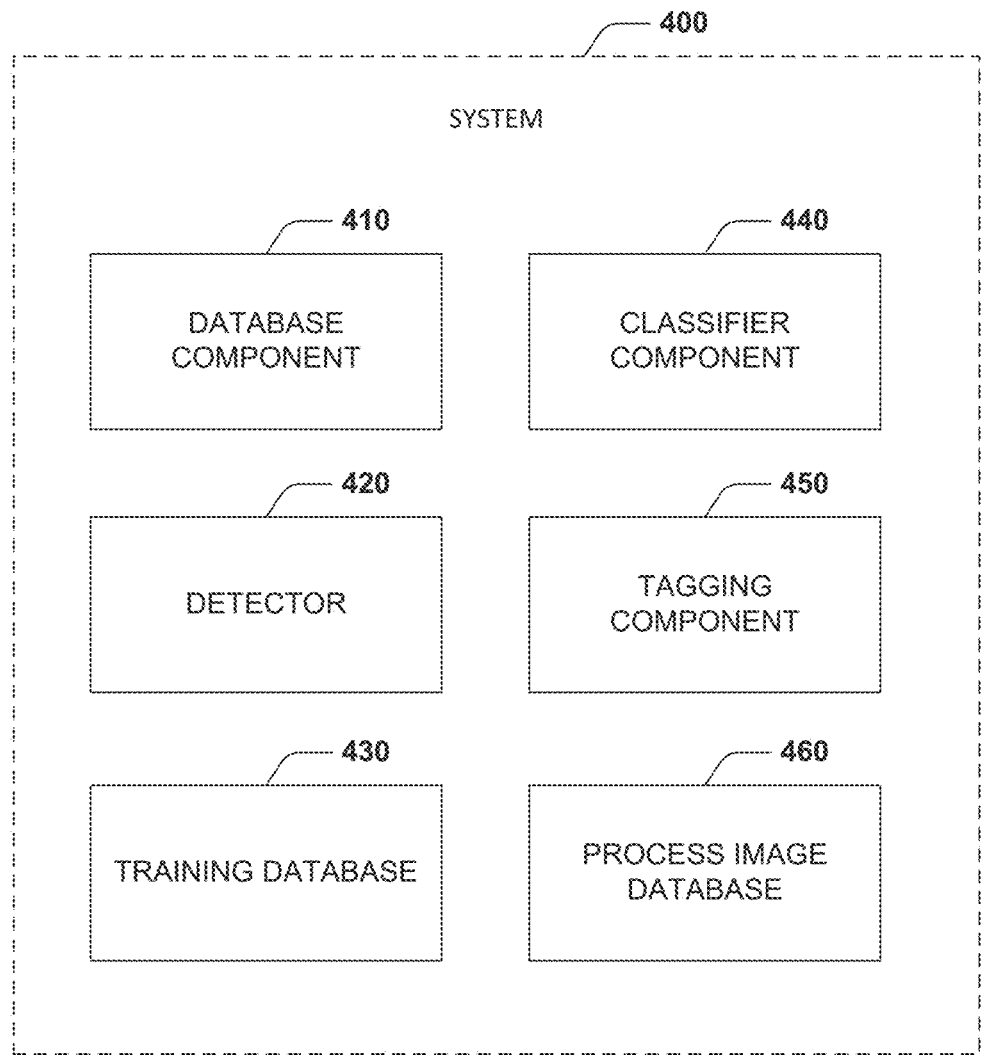
FIG. 4 illustrates an example component diagram of a system using Gabor transforms to determine AUs and emotion categories.

FIG. 4 illustrates an example component diagram of a system 400 to perform the functions described above with respect to FIGS. 1-3. The system 400 includes an image database component 410 having a set of images. The system 400 includes detector 420 to eliminate non-face images in the image database. Creates a subset of the set of images of images only including faces. The system 400 includes a training database 430. The training database 430 is utilized by a classifier component 440 to classify images into an emotion category. The system 400 includes a tagging component 450 that tags the images with at least one AU and an emotion category. The system 400 can store the tagged images in a processed image database 460.

Discriminant Functional Learning of Color Features for the Recognition of Facial Action Units In another aspect, a system facilitates comprehensive computer vision processes for the identification of AUs using facial color features. Color features can be used to recognize AUs and Au intensities. The functions defining color change as an AU goes from inactive to active or vice-versa are consistent within AUs and the differentials between them. In addition, the system reveals how facial color changes can be exploited to identify the presence of AUs in videos filmed under a large variety of image conditions and externally of image database.

The system receives an $i^{th}$ sample video sequence $V_i = \{I_{i1}, \ldots, I_{ir_i}\}$, where $r_i$ is the number of frames and $I_{ik} \in \mathbb{R}^{3qw}$ is the vectorized $k^{th}$ color image of $q \times w$ RGB pixels. $V_i$ can be described as the sample function $f_i(t)$.

The system identifies a set of physical facial landmarks on the face and obtains local face regions using algorithms described herein. The system defines the landmark points in vector form as $s_{ik}=(s_{ik1}, \ldots, s_{ik66})$, where i is the sample video index, k the frame number, and $s_{ik1} \in \mathbb{R}^2$ are the 2D image coordinates of the $l^{th}$ landmark, $l=1, \ldots, 66$. For purposes of explanation, specific example values may be used (e.g. 66 landmarks, 107 image patches) in this description. It is appreciated that the values may vary according to image sets, faces, landmarks, and/or the like.

The system defines a set $D_{ij}=\{d_{i1k}, \ldots, d_{i107k}\}$ as a set of 107 image patches $d_{ijk}$ obtained with a Delaunay triangulation as described above, where $d_{ijk} \in \mathbb{R}^{3q_{ij}}$ is the vector describing the $j^{th}$ triangular local region of $q_{ij}$ RGB pixels and, as above, i specifies the sample video number ($i=1, \ldots, n$) and k the frame ($k=1, \ldots, r_i$).

In some embodiments, the size (i.e., number of pixels, $q_{ij}$) of these local (triangular) regions not only varies across individuals but also within a video sequence of the same person. This is a result of the movement of the facial landmark points, a necessary process to produce a facial expression. The system defines a feature space that is invariant to the number of pixels in each of these local regions. The system computes statistics on the color of the pixels in each local region as follows.

The system computes the first and second (central) moments of the color of each local region, $$\mu_{ijk} = q_{ij}^{-1} \sum_{p=1}^{P} d_{ijkp} \qquad (18)$$

$$\sigma_{ijk} = \sqrt{q_{ij}^{-1} \sum_{p=1}^{P} (d_{ijkp} - \mu_{ijk})^2},$$

with $d_{ijk}=(d_{ijk1}, \ldots, d_{ijkP})^T$ and $\mu_{ijk}, \sigma_{ijk} \in \mathbb{R}^3$. In some embodiments, additional moments are computed.

The color feature vector of each local patch can be defined as $$x_{ij} = (\mu_{ij1}, \ldots, \mu_{ijr}, \sigma_{ij1}, \ldots, \sigma_{ijr_i})^T, \qquad (19)$$

where, i is the sample video index ($V_i$), j the local patch number and $r_i$ the number of frames in this video sequence. This feature representation defines the contribution of color in patch j. In some embodiments, other proven features can be included to increase richness of the feature representation. For example, responses to filters or shape features.

Invariant Functional Representation of Color

The system can define the above computed color information as a function invariant to time, i.e., the functional representation is consistent regardless of where in the video sequence an AU becomes active.

The color function $f(.)$ that defines color variations of a video sequence V, and a template function $f_T(.)$ that models the color changes associated with the activation of an AU (i.e., from AU inactive to active). The system determines if $f_T(.)$ is in $f(.)$.

In some embodiments, the system determines this by placing the template function $f_T(.)$ at each possible location in the time domain of $f(.)$. This is typically called a sliding-window approach, because it involves sliding a window left and right until all possible positions of $f_T(.)$ have been checked.

In other embodiments, the system derives a method using a Gabor transform. The Gabor transform is designed to determine the frequency and phase content of a local section of a function to derive an algorithm to find the matching of $f_T(.)$ in $f(.)$ without using a sliding-window search.

In this embodiment, without loss of generality, $f(t)$ can be a function describing one of the color descriptors, e.g., the mean of the red channel in the $j^{th}$ triangle of video i or the first channel in an opponent color representation. Then, the Gabor transform of this function is $$G(t,f) = \int_{-\infty}^{\infty} f(\tau) g(\tau-t) e^{-2\pi j f \tau} d\tau, \qquad (20)$$

where $g(t)$ is a concave function and $j = \sqrt{-1}$. One possible pulse function may be defined as $$g(t) = \begin{cases} 1, & 0 \le t \le L \\ 0, & \text{otherwise} \end{cases}, \qquad (21)$$

where L is a fixed time length. Other pulse functions might be used in other embodiments. Using the two equations yields $$\begin{aligned} G(t, f) &= \int_{t-L}^{t} f(\tau) e^{-2\pi j f \tau} d\tau \\ &= e^{-2\pi j f(t-L)} \int_{0}^{L} f(\tau+t-L) e^{-2\pi j f \tau} d\tau. \end{aligned} \qquad (22)$$

as the definition of a functional inner product in the timespan $[0, L]$ and, thus, $G(.,.)$ can be written as $$G(t,f) = e^{-2\pi j f(t-L)} \langle f(\tau+t-L), e^{-2j\pi f \tau} \rangle, \qquad (23)$$

where $\langle ., . \rangle$ is the functional inner product. The Gabor transform above is continuous in time and frequency, in the noise-free case.

To compute the color descriptor of the $i^{th}$ video, $f_{i1}(t)$, all functions are defined in a color space spanned by a set of b basis functions $\phi(t) = \{\phi_0(t), \ldots, \phi_{b-1}(t)\}$, with $f_{i1}(t) = \sum_{a=0}^{b-1} c_{i_1,z} \phi_z(t)$ and $c_{i_1} = (c_{i_1,0}, \ldots, c_{i_1,b-1})^T$ as the vector of coefficients. The functional inner product of two color descriptors can be defined as $$\langle f_{i_1}(t), f_{i_2}(t) \rangle = \sum_{\forall i,q} \int_0^L c_{i_1,r} \phi_{i_1}(t) c_{i_2,q} \phi_{i_2}(t) dt = c_{i_1}^T \Phi(t) c_{i_2}, \qquad (24)$$

where $\Phi$ is a b×b matrix with elements $\Phi_{ij} = \langle \phi_i(t), \phi_j(t) \rangle$.

In some embodiments, the model assumes that statistical color properties change smoothly over time and that their effect in muscle activation has a maximum time span of L seconds. The basis functions that fit this description are the first several components of the real part of the Fourier series, i.e., normalized cosine basis. Other basis functions can be used in other embodiments.

Cosine bases can be defined as $\psi_z(t) = \cos(2\pi z t)$, $z=0, \ldots, b-1$. The corresponding normalized bases are defined as $$\hat{\psi}_z(t) = \frac{\psi_z(t)}{\sqrt{\langle \psi_z(t), \psi_z(t) \rangle}}. \qquad (25)$$

The normalized basis set allows $\Phi = \text{Id}_b$, where $\text{Id}_b$ denotes the b×b identity matrix, rather than an arbitrary positive definite matrix.

The above derivations with the cosine bases makes the frequency space implicitly discrete. The Gabor transform $\tilde{G}(.,.)$ of color functions becomes $$\tilde{G}(t,z) = \langle \tilde{f}_{i_1}(t), \hat{\psi}_z(t) \rangle = c_{i_1,z}, z=0, \ldots, b-1, \qquad (26)$$

where $\tilde{f}_{i_1}(t)$ is the computed function $f_{i_1}(t)$ in the interval $[t-L, t]$ and $c_{i_1,z}$ is the $z^{th}$ coefficient.

It is appreciated that the above-derived system does not include the time domain, however, the time domain coefficients can be found and utilized, where needed.

Functional Classifier of Action Units

The system employs the Gabor transform derived above to define a feature space invariant to the timing and duration of an AU. In the resulting space, the system employs a linear or non-linear classifier. In some embodiment, a KSDA, a Support Vector Machine (SVM) or a Deep multilayer neural Network (DN) may be used as classifier.

Functional Color Space

The system includes functions describing the mean and standard deviation of color information from distinct local patches, which uses simultaneous modeling of multiple functions described below.

The system defines a multidimensional function $\Gamma_i(t) = (\gamma_i^1(t), \ldots, \gamma_i^2(t))^T$, with each function $\gamma_z(t)$ the mean or standard deviation of a color channel in a given patch. Using the basis expansion approach, each $\gamma_i^e(t)$ is defined by a set of coefficients $c_{i,e}$ and, thus, $\Gamma_i(t)$ is given by:

$$c_i^T = [(c_i^1)^T, \ldots, (c_i^g)^T]. \qquad (27)$$

The inner product for multidimensional functions is redefined using normalized Fourier cosine bases to achieve $$\langle \Gamma_i(t), \Gamma_j(t) \rangle = \sum_{e=1}^{g} \langle \gamma_i^e(t), \gamma_j^e(t) \rangle \sum_{e=1}^{g} (c_i^e)^T c_j^e = c_i^T c_j. \qquad (28)$$

Other bases can be used in other embodiments.

The system uses a training set of video sequences to optimize each classifier. It is important to note that the system is invariant to the length (i.e., number of frames) of a video. Hence, the system does not use alignment or cropping of the videos for recognition.

In some embodiments, the system can be extended to identify AU intensity using the above approach and a multi-class classifier. The system can be trained to detect AU and each of the five intensities, a, b, c, d, and e and AU inactive (not present). The system can also be trained to identify emotion categories in images of facial expressions using the same approach described above.

In some embodiments, the system can detect AUs and emotion categories in videos. In other embodiments, the system can identify AUs in still images. To identify AUs in still images, the system first learns to compute the functional color features defined above from a single image with regression. In this embodiment, the system regresses a function $h(x) = y$ to map an input image x into the required functional representation of color y.

Support Vector Machines

A training set is defined $\{(\gamma_1(t), y_1), \ldots, (\gamma_n(t), y_n)\}$, where $\gamma_i(t) \in H^v$, $H^v$ is a Hilbert space of continuous functions with bounded derivatives up to order v, and $y_i \in \{-1, 1\}$ are their class labels, with +1 indicating that the AU is active and −1 inactive.

When the samples of distinct classes are linearly separable, the function $w(t)$ that maximizes class separability is given by $$J(w(t), v, \xi) = \min_{w(t), v, \xi} \left\{ \frac{1}{2} \langle w(t), w(t) \rangle + C \sum_{i=1}^{n} \xi_i \right\} \quad (29)$$

subject to $y_i(\langle w(t), \gamma_i(t) \rangle - v) \geq 1 - \xi_i$, $\xi_i \geq 0$, where v is the bias and, as above, $\langle \gamma_i(i), \gamma_j(t) \rangle = \int \gamma i(t) \gamma j(t) \, dt$ denotes the functional inner product $\xi = (\xi_1, \ldots, \xi_n)^T$ are the slack variables, and C>0 is a penalty value found using cross-validation.

Applied to our derived approach to model $\Gamma_i$ using normalized cosine coefficients jointly with (28), transforms (29) to the following criterion $$J(w, v, \xi, \alpha) \quad (30)$$

$$\min_{w, \xi, b, a} \left\{ \frac{1}{2} w^T w + C \sum_{i=1}^{n} \xi_i - \sum_{i=1}^{n} \alpha_i(y_i(w^T c_i - v) - 1 + \xi_i) - \sum_{i=1}^{n} \theta_i \xi_i \right\}.$$

where C>0 is a penalty value found using cross-validation.

The system projects the original color spaces onto the first several (e.g., two) principal components of the data. The principal components are given by Principal Components Analysis (PCA). The resulting p dimensions are labeled $\varphi_{PCA_k}$, k=1, 2, . . . , p.

Once trained, the system can detect AUs, AU intensities and emotion categories in video in real time or faster than real time. In some embodiments, the system can detect AUs at greater than 30 frames/second/CPU thread.

Deep Network Approach Using Multilayer Perceptron

In some embodiments, the system can include a deep network to identify non-linear classifiers in the color feature space.

The system can train a multilayer perceptron network (MPN) using the coefficients $c_i$. This deep neural network is composed of several (e.g., 5) blocks of connected layers with batch normalization and some linear or non-linear functional rectification, e.g., rectified linear units (ReLu). To effectively train the network, the system uses data augmentation by super-sampling the minority class (AU active/AU intensity) or down-sampling the majority class (AU not active); the system may also use class weights and weight decay.

We train this neural network using gradient descent. The resulting algorithm works in real time or faster than real time, >30 frames/second/CPU thread.

AU Detection in Still Images

To apply the system to still images, the system specifies color functions $f_i$ of image $I_i$. That is, the system defines the mapping $h(I_i) = f_i$ where $f_i$ is defined by its coefficients $c_i^T$. In some embodiments, the coefficients can be learned from training data using non-linear regression.

The system utilizes a training set of m videos, $\{V_1, \ldots, V_m\}$. As above, $V_i = \{I_{i1}, \ldots, I_{iri}\}$. The system considers every sub-set of consecutive frames of length L (with L≤$r_i$), i.e., $W_{i1} = \{I_{i1}, \ldots, I_{iL}\}$, $W_{i2} = \{I_{i2}, \ldots, I_{i(L+1)}\}$, . . . , $W_{i(ri-L)} = \{I_{i(ri-L)}, \ldots, I_{iri}\}$. The system computes the color representations of all $W_{ik}$ as described above. This yields $x_{tk} = (x_{i1k}, \ldots, X_{i107k})^T$ for each $W_{ik} = 1, \ldots, r_i - L$. Following (19)

$$x_{ijk} = (\mu_{ij1}, \ldots, \mu_{ijL}, \sigma_{ij1}, \ldots, \sigma_{ijL})^T, \quad (31)$$

where i and k specify the video $W_{ik}$, and j the patch, j=1, . . . , 107.

The system computes the functional color representations $f_{ijk}$ of each $W_{ik}$ for each of the patches, j=1, . . . , 107. This is done using the approach detailed above to yield $f_{ijk} = (c_{ijk1}, \ldots, c_{ijkQ})^T$, where $c_{ijkq}$ is the $q^{th}$ coefficient of the j patch in video $W_{ij}$. The training set is then given by the pairs $\{x_{ijk}, f_{ijk}\}$. The training set is used to regress the function $f_{ijk} = h(x_{ijk})$. For example, let $\hat{I}$ be a test image and $\hat{x}_j$ its color representation in patch j. Regression is used to estimate the mapping from image to functional color representation, as defined above. For example, Kernel Ridge Regression can be used to estimate the $q^{th}$ coefficient of the test image as:

$$\hat{c}_{jq} = C^T(K + \lambda Id)^{-1} \kappa(\hat{x}_j), \quad (32)$$

where $\hat{x}_j$ is the color feature vector of the $j^{th}$ patch $C = (c_{1j1q}, \ldots, c_{mj(r_m-L)q})^T$ is the vector of coefficients of the $j^{th}$ patch in all training images. K is the Kernel matrix, $K(i,j) = k(x_{ijk}, x_{\hat{i}j\hat{k}})$ (i and $\hat{i}$=1, . . . , m, k and $\hat{k}$=1, . . . , $r_i$–L), and $\kappa(\hat{x}_j) = (k(\hat{x}_j, x_{1j1}), \ldots, k(\hat{x}_j, x_{mj(r_m-L)}))^T$. The system can use the Radial Basis Function kernel, $k(a, b; \eta) = \exp(-\eta \|a-b\|^2)$. In some embodiments, the parameters $\eta$ and $\lambda$ are selected to maximize accuracy and minimize model complexity. This is the same as optimizing the bias-variance tradeoff. The system uses a solution to the bias-variance problem as known in the art.

As shown above, the system can use a regressor on previously unseen test images. If $\hat{I}$ is a previously unseen test image. Its functional representation is readily obtained as $\hat{c} = h(\hat{x})$, with $\hat{c} = (c_{11}, \ldots, c_{107Q})^T$. This functional color representation can be directly used in the functional classifier derived above.

Figure 5:
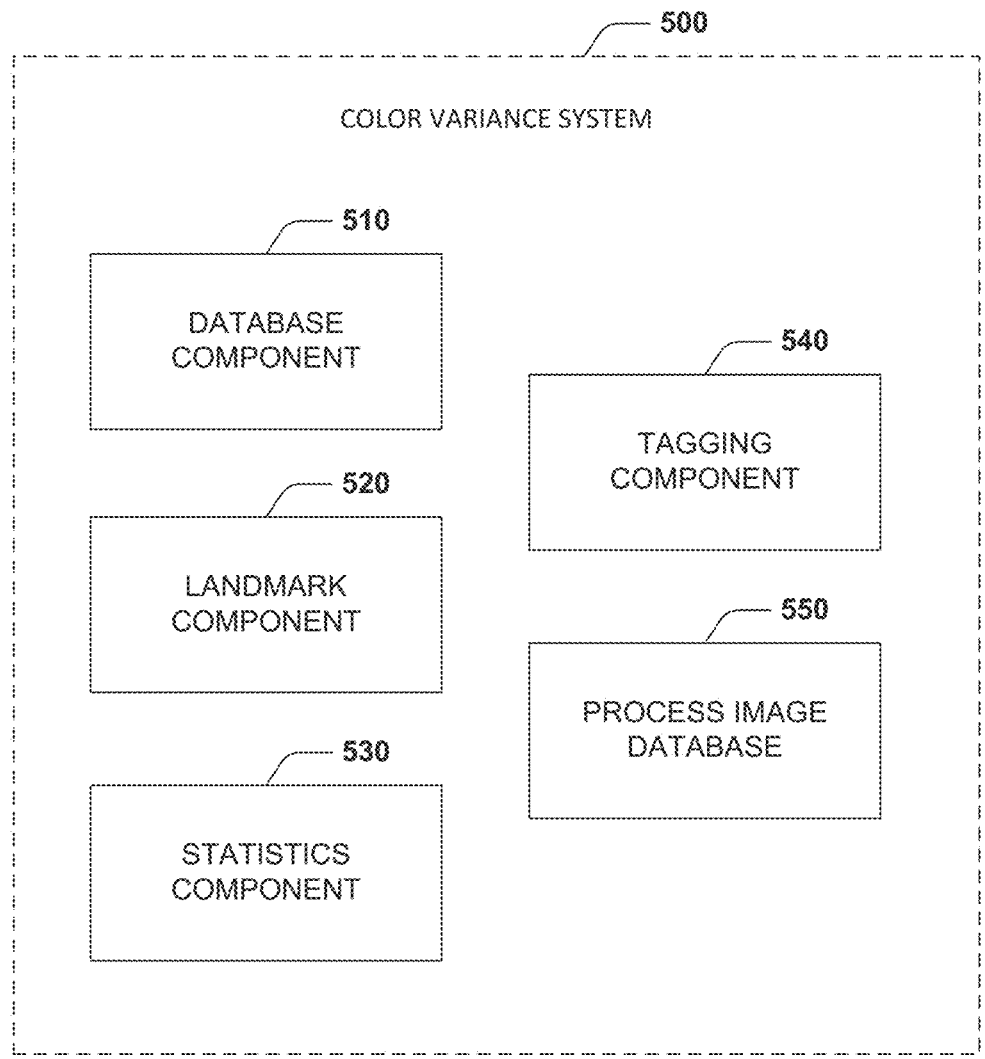
FIG. 5 illustrates a color variance system for detecting AUs using color features in video and/or still images.

FIG. 5 illustrates a color variance system 500 for detecting AUs or emotions using color variance in video and/or still images. The system 500 includes an image database component 510 having a set of videos and/or images. The system 500 includes a landmark component 520 that detects landmarks in the image database 510. The landmark component 520 creates a subset of the set of images of images with defined landmarks. The system 500 includes a statistics component 530 that calculates changes in color in a video sequence or statistics in a still image of a face. From the statistics component 530, AUs or emotions are determined for each video or image in the database component 510 as described above. The system 500 includes a tagging component 540 that tags the images with at least one AU or no AU. The system 500 can store the tagged images in a processed image database 550.

Facial Color Used to Recognize Emotion in Images of Facial Expressions and Edit Images of Faces to Make them Appear to Express a Different Emotion In the methodology described above, the system used configural, shape, shading and color features to identify AUs. This is because, AUs define emotion categories, i.e., a unique combination of AUs, specifies a unique emotion category. Nonetheless, facial color also transmits emotion. Face can express emotion information to observers by changing the blood flow on the network of blood vessels closest to the surface of the skin. Consider, for instance, the redness associated with anger or the paleness in fear. These color patterns are caused by variations in blood flow and can occur even in the absence of muscle activation. Our system detects these color variations, which allows it to identify emotion even in the absence of muscle action (i.e., regardless of whether AUs are present or not in the image).

Areas of the Face.

The system denotes each face color image of p by q pixels as $I_{ij} \in \mathbb{R}^{p \times q \times 3}$ and the r landmark points of each of the facial components of the face as $s_{ij}=(s_{ij1}, \ldots, s_{ijr})^T$, $s_{ijk} \in \mathbb{R}^2$ the 2-dimensional coordinates of the landmark point on the image. Here, i specifies the subject and j the emotion category. In some embodiments, the system uses r=66. These fiducial points define the contours of the internal and external components of the face, e.g. mouth, nose, eyes, brows, jawline and crest. Delaunay triangulation can be used to create the triangular local areas defined by these facial landmark points. This triangulation yields a number of local areas (e.g., 142 areas when using 66 landmark points). Let this number be a.

The system can define a function $D=\{d_1, \ldots, d_a\}$, as a set of functions that return the pixels of each of these a local regions, i.e., $d_k(I_{ij})$ is a vector including the l pixels within the $k^{th}$ Delaunay triangle in image $I_{ij}$, i.e., $d_k(I_{ij}) = (d_{ijk1}, \ldots, d_{ijkl})^T \in \mathbb{R}^{3l}$, where $d_{ijks} \in \mathbb{R}^3$ defines the values of the three color channels of each pixel.

Color Space.

The above derivations divide each face image into a set of local regions. The system can compute color statistics of each of these local regions in each of the images. Specifically, the system computes first and second moments (i.e., mean and variance) of the data, defined as $$\mu_{ijk} = l^{-1} \sum_{s=1}^{l} d_{ijks}$$

$$\sigma_{ijk} = \sqrt{l^{-1} \sum_{s=1}^{l} (d_{ijks} - \mu_{ijk})^2}.$$

In other embodiments, additional moments of the color of the image are utilized. Every image $I_{ij}$ is now represented using the following feature vector of color statistics, $x_{ij} = (\mu_{ij1}^T, \sigma_{ij1}^T, \ldots, \mu_{ij120}^T, \sigma_{ij120}^T)^T \in \mathbb{R}^{720}$.

Using the same modeling, the system defines a color feature vector of each neutral face as $x_{in} = (\mu_{in1}^T, \sigma_{in1}^T, \ldots, \mu_{in120}^T, \sigma_{in120}^T)^T$, where n indicates this feature vector corresponds to a neutral expression, not an emotion category. The average neutral face is $\bar{x}_n = m^{-1} \sum_{i=1}^{m} x_{in}$, with m the number of identities in the training set. The color representation of a facial expression of emotion is then given by its deviation from this neutral face, $\hat{x}_{ij} = x_{ij} - \bar{x}_n$.

Classification.

The system uses a linear or non-linear classifier to classify emotion categories in the color space defined above. In some embodiments, Linear Discriminant Analysis (LDA) is computed on the above-defined color space. In some embodiments, the color space can be defined by eigenvectors associated with a non-zero eigenvalues of the matrix $\Sigma_x^{-1} S_B$, where $\Sigma_x = \sum_{i=1}^{m} \sum_{j=1}^{18} (\hat{x}_{ij} - \mu)(\hat{x}_{ij} - \mu)^T + \delta I$ is the (regularized) covariance matrix, $S_B = \sum_{j=1}^{C} (\bar{x}_j - \mu)(\bar{x}_j - \mu)^T$, $\bar{x}_j = m^{-1} \sum_{i=1}^{m} \hat{x}_{ij}$ are the class means, $\mu = (18 \, m)^{-1} \sum_{i=1}^{m} \sum_{j=1}^{18} \hat{x}_{ij}$, I is the identity matrix, $\delta = 0.01$ the regularizing parameter, and C the number of classes.

In other embodiments, the system can employ Subclass Discriminate Analysis (SDA), KSDA, or Deep Neural Networks.

Multiwavy Classification

The selected classifier (e.g., LDA) is used to compute the color space (or spaces) of the C emotion categories and neutral. In some embodiments, the system is trained to recognize 23 emotion categories, including basic and compound emotions.

The system divides the available samples into ten different sets $S=\{S_1, \ldots, S_{10}\}$, where each subset $S_t$ with the same number of samples. This division is done in a way that the number of samples in each emotion category (plus neutral) is equal in every subset. The system repeats the following procedure with $t=1, \ldots, 10$: All the subsets, except $S_t$, are used to compute $\Sigma_x$ and $S_B$. The samples in subset St, which were not used to compute the LDA subspace $\Im$, are projected onto $\Im$. Each of the test sample feature vectors $t_j \in S_t$ is assigned to the emotion category of the nearest category mean, given by the Euclidean distance, $e^*_j = \arg\min_e (t_j - \bar{x}_e)^T (t_j - \bar{x}_e)$. The classification accuracy over all the test samples $t_j \in S_t$ is given by $\mu_{t^{th}\text{-}fold} = n_t^{-1} \Sigma_{\forall x_j \in S_t} 1_{\{e^*_j = y(t_j)\}}$, where $n_t$ is the number of samples in $S_t$, $y(t_j)$ is the oracle function that returns the true emotion category of sample $t_j$, and $1_{\{e^*_j = y(t_j)\}}$ is the zero-one loss which equals one when $e^*_j = y(t_j)$ and zero elsewhere. Thus, $S_t$ serves as the testing subset to determine the generalization of our color model. Since $t=1, \ldots, 10$, the system can repeat this procedure ten times, each time leaving one of the subsets $S_t$ out for testing, and then compute the mean classification accuracy as, $\mu_{10\text{-}fold} = 0.1 \Sigma_{t=1}^{10} \mu_{t^{th}\text{-}fold}$. The standard deviation of the cross-validated classification accuracies is $\sigma_{10\text{-}fold} = \sqrt{0.1 \Sigma_{t=1}^{10} (\mu_{t^{th}\text{-}fold} - \mu_{10\text{-}fold})^2}$. This process allows the system to identify the discriminant color features with best generalizations, i.e., those that apply to images not included in the training set.

In other embodiments, the system uses a 2-way (one versus all) classifier.

One-Versus-all Classification:

The system identifies the most discriminant color features of each emotion category by repeating the approach described above C times, each time assigning the samples of one emotion category (i.e., emotion category c) to class 1 (i.e., the emotion under study) and the samples of all other emotion categories to class 2. Formally, $S_c = \{\forall t_j | y(t_j) = c\}$ and $\bar{S}_c = \{\forall t_j | y(t_j) \neq c\}$, with $c = (1, \ldots, C)$.

A linear or no-linear classifier (e.g., KSDA) is used to discriminate the samples in $S_c$ from those in $\bar{S}_c$.

Ten-fold cross-validation: The system uses the same 10-fold cross-validation procedure and nearest-mean classifier described above.

In some embodiments, to avoid biases due to the sample imbalance in this two class problem, the system can apply downsampling on $\bar{S}_c$. In some cases, the system repeat this procedure a number of times, each time drawing a random sample from $\bar{S}_c$ to match the number of samples in $S_c$.

Discriminant Color Model:

When using LDA as the 2-way classifier, $\Sigma_x^{-1} S_B V = V \Lambda$ provides the set of discriminant vectors $V = (v_1^T, \ldots, v_b^T)$, ordered from most discriminant to least discriminant, $\lambda_1 > \lambda_2 = \ldots = \lambda_b = 0$, where $\Lambda = \text{diag}(\lambda_1, \lambda_2, \ldots \lambda_b)$. The discriminant vector $v_1 = (v_{1,1}, \ldots, v_{1,720})^T$ defines the contributions of each color feature in discriminating the emotion category. The system may only keep the $v_1$ since this is the only basis vector associated to a non-zero eigenvalues, $\lambda_1 > 0$. The color model of emotion j is thus given by $\tilde{x}_j = v_1^T \bar{x}_j$. Similarly, $\tilde{x}_n = v_1^T \bar{x}_n$.

Similar results are obtained when using SDA, KSDA, Deep Networks and other classifiers.

Modifying Image Color to Change the Apparent Emotion Expressed by a Face.

The neutral expressions, $I_{in}$, can be modified by the system to appear to express an emotion. These can be called modified images $\tilde{I}_{ij}$, where i specifies the image or individual in the image, and j the emotion category. $\tilde{I}_{ij}$ corresponds to the modified color feature vectors $y_{ij}=x_{in}+\alpha(\tilde{x}_j-\tilde{x}_n)$, with $\alpha>1$. In some embodiments, to create these images, the system modifies the $k^{th}$ pixel of the neutral image using the color model of emotion j as follows:

$$\tilde{I}_{ijk} = \left(\frac{I_{ink} - w_g}{\varrho_g}\right)(\varrho_g + \beta\tilde{\varrho}_g) + (w_g + \beta\tilde{w}_g),$$

where $I_{ink}$ is the $k^{th}$ pixel of the neutral image $I_{in}$, $I_{ink} \in d_g$ ($I_{in}$), $w_g$ and $\varrho_g$ are the mean and standard deviation of the color of the pixels in the $g^{th}$ Delaunay triangle, and $\tilde{w}_g$ and $\tilde{\varrho}$ are the mean and standard deviation of the color of the pixels in $d_g$ as given by the new model $y_{ij}$.

In some embodiments, the system smooths the modified images with a r by r Gaussian filter with variance σ. The smoothing eliminates local shading and shape features, forcing people to focus on the color of the face and making the emotion category more apparent.

In some embodiments, the system modifies images of facial expressions of emotion to decrease or increase the appearance of the expressed emotion. To decrease the appearance of the emotion j, the system can eliminate the color pattern associated to emotion j to obtain the resulting image $\overline{I}_{ij}$. The images are computed as above using the associated feature vectors $\overline{z}_{ij}=x_{ij}-\beta(\tilde{x}_j-\tilde{x}_n)$, i=1, ... 184, j=1, ... 18, β>1.

To increase the perception of the emotion, the system defines the new color feature vectors as $z_{ij}^+=x_{ij}+\alpha(\tilde{x}_j-\tilde{x}_n)$, i=1, ... 184, j=1, ... 18, α>1 to obtain resulting images $I_{ij}^+$.

Figure 6:
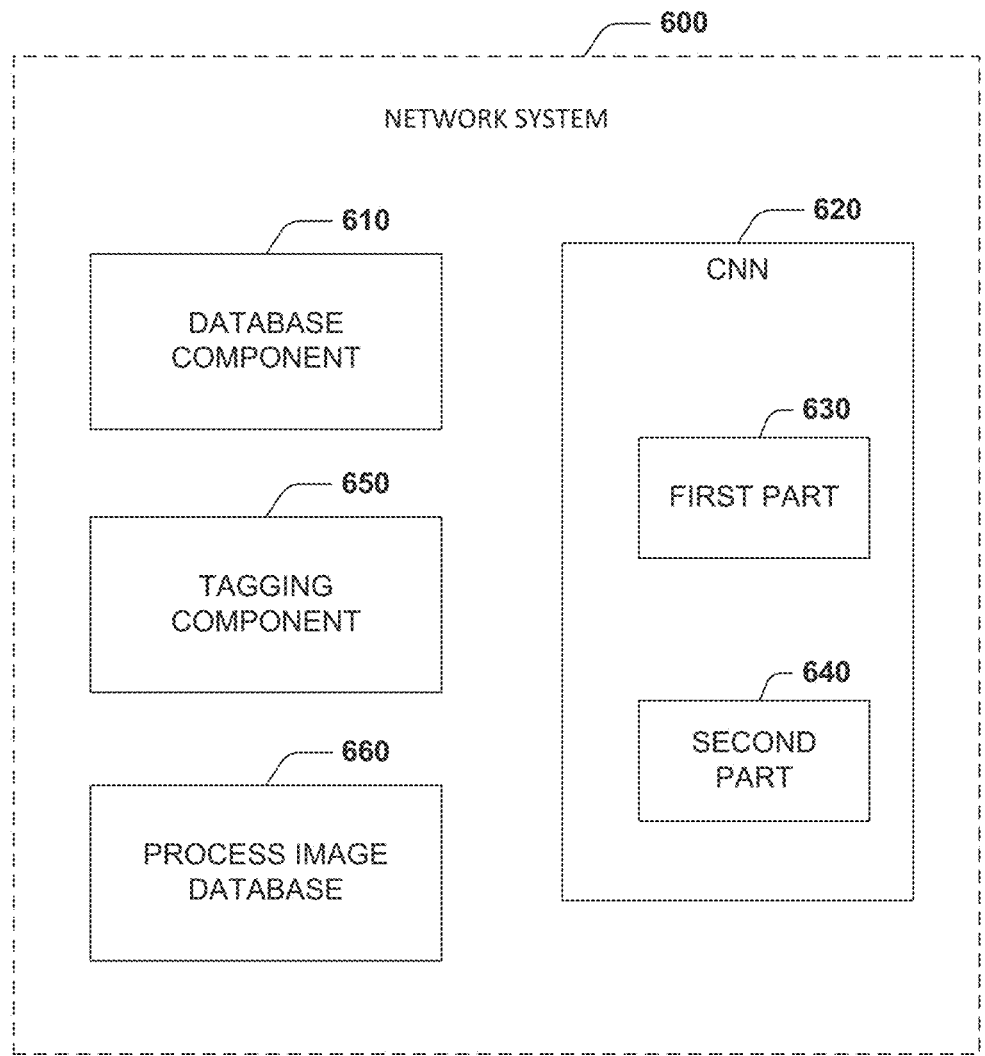
FIG. 6 illustrates a color variance system for detecting AUs using color features in video and/or still images.

FIG. 6 illustrates the color variance system 500 for detecting AUs or emotions using color variance in video and/or still images. The system 600 includes an image database component 610 having a set of videos and/or images. The system 600 includes a landmark component 620 that detects landmarks in the image database 610. The landmark component 620 creates a subset of the set of images of images with defined landmarks. The system 600 includes a statistics component 630 that calculates changes in color in a video sequence or statistics in a still image of a face. From the statistics component 630, AUs or emotions are determined for each video or image in the database component 610 as described above. The system 600 includes a tagging component 640 that tags the images with at least one AU or no AU. The system 600 can store the tagged images in a processed image database 650.

The system 600 includes a modification component 660 that can change perceived emotions in an image. In some embodiments, after the system 600 determines a neutral face in an image the modification component 660 modifies the color of the image of the neutral face to yield or change the appearance of a determined expression of an emotion or an AU. For example, an image is determined to include a neutral expression. The modification component 660 can alter the color in the image to change the expression to perceive a predetermined expression such as happy or sad.

In other embodiments, after the system 600 determines an emotion or AU in a face in an image, the modification component 660 modifies the color of the image to increase or decrease the intensity of the emotion or AU to change the perception of the emotion or the AU. For example, an image is determined to include a sad expression. The modification component 660 can alter the color in the image to make the expression be perceived as less or more sad.

Global-Local Fitting in DNNs for Fast and Accurate Detection and Recognition of Facial Landmark Points and Action Units In another aspect, a Global-Local loss function for Deep Neural Networks (DNNs) is presented that can be efficiently used in fine-grained detection of similar object landmark points (e.g., facial landmark points) of interest as well as fine-grained recognition of object attributes, e.g., AUs. The derived local+global loss yields accurate local results without the need to use patch-based approaches and results in fast and desirable convergences. The instant Global-Local loss function may be used for the recognition of AUs or detecting faces and facial landmark points necessary for the recognition of AUs and facial expressions.

Global-Local Loss

Derivations of a global-local (GL) loss that can be efficiently used in deep networks for detection and recognition in images. A system can use this loss to train a deep DNN to recognize AUs. The system uses a portion of the DNN to detect facial landmark points. These detections are concatenated with the output of the fully connected layer of the other components of the network to detect AUs.

Local Fit

The system defines image samples and corresponding output variables as the set $\{(I_1, y_1), \ldots, (I_n,y_n)\}$, where $I_i \in R^{l \times m}$ is a l×m-pixel image of a face, $y_i$ is the true (desirable) output, and n is the number of samples.

In some embodiments, the output variable $y_i$ can be in various forms. For example, in the detection of 2D object landmark points in images, $y_i$ is a vector of p 2D image coordinates $y_i=(u_{i1}, v_{i1}, \ldots, u_{ip}, v_{ip})^T$, $(u_{ij}, v_{ij})^T$ the $j^{th}$ landmark points. In the recognition of AUs, the output variable corresponds to an indicator vector $y_i=(y_{i1}, \ldots, y_{iq})T$, with $y_{ij}=1$ if AU j is present in image $I_i$ and $y_{ij}=-1$ when AU j is not present in that image.

The system identifies a vector of mapping functions $f(I_i,w)=(f_1(I_i, w_1), \ldots, f_r(I_i,w_r))^T$ that converts the input image $I_i$, to an output vector $y_i$ of detections or attributes, and $w=(w_1, \ldots, w_r)^T$ is the vector of parameters of these mapping functions. Note that r=p and $f(.)=(\hat{u}_{i1}, \hat{v}_{i1}, \ldots, \hat{u}_{ip}, \hat{v}_{ip})^T$ in detection, here with $f_j(I_i, w_j)=(\hat{u}_{ij}, \hat{v}_{ij})^T$ as the estimates of the 2D image coordinates $u_{ij}$ and $v_{ij}$. Similarly, r=q and $f(.)=(\hat{y}_{i1}, \ldots, \hat{y}_{iq})^T$ in the recognition of AUs, where $\hat{y}_{ij}$ is the estimate of whether AU j is present (1) or not (−1) in image $I_i$, and q is the number of AUs.

For a fixed mapping function $f(I_i, w)$ (e.g., a DNN), the system optimizes w, defined as $$\mathcal{J}(\tilde{w}) = \min_w \mathcal{L}_{local}(f(I_i, w), y_i), \qquad (33)$$

where $\mathcal{L}_{local}(.)$ denotes the loss function. A classical solution for this loss function is the $L^2$-loss, defined as, $$\mathcal{L}_{local}(f(I_i, w), y_i) = r^{-1}\sum_{j=1}^{r}(f_j(I_i, w_j) - y_{ij})^2, \qquad (34)$$

where $y_{ij}$ is the $j^{th}$ element of $y_i$, which is $y_{ij} \in R^2$ in the detection of face landmark points and $y_{ij} \in \{-1, +1\}$ in the recognition of AUs.

Without loss of generality, the system uses $f_i$ in lieu of $f(I_i, w)$ and $f_{ij}$ instead of $f_j(I_i, w_j)$. Note that the functions $f_{ij}$ are the same for all $i$, but may be different for distinct values of $j$.

The above derivations correspond to a local fit. That is, (33) and (34) attempt to optimize the fit of each one of the outputs independently and then take the average fit over all outputs.

The above derived approach has several solutions, even for a fixed fitting error $\mathcal{J}(.)$. For example, the error can be equally distributed across all outputs $\|f_{ij} - y_{ij}\|_2 \approx \|f_{ik} - y_{ik}\|_2$, $\forall j, k$, where $\|.\|_2$ is the 2-norm of a vector. Or, most of the error may be in one (or a few) of the estimates, defined as $$\|f_{ij} - y_{ij}\|_2 \gg \|f_k - y_{ik}\|_2 \text{ and } \|f_k - y_{ik}\|_2 \approx 0, \forall k \neq j$$

In some embodiments, an additional constraint is added to minimize the function $$\frac{2}{r(r+1)} \sum_{1 \leq j < k \leq r} |(f_{ij} - y_{ij}) - (f_{ik} - y_{ik})|^\alpha \quad (35)$$

with $a \geq 1$. The system adds global criterion that facilitates convergence.

Adding Global Structure

The system defines a set of constraints to add global structure extending global descriptors. The constraint in (34) is local because it measures the fit of each element of $y_i$ (i.e., $y_{ij}$) independently. The same criterion can nonetheless be used to measure the fit of pairs of points; formally defined as $$\mathcal{L}_{pairs}(f_i, y_i) = \frac{2}{r(r+1)} \sum_{1 \leq j < k \leq r} (g(h(f_{ij}), h(f_{ik})) - g(y_{ij}, y_{ik}))^2, \quad (36)$$

where $g(x,z)$ is a function that computes the similarity between its two entries, and $h(.)$ scales the (unconstrained) output of the network into the appropriate value range In landmark detection, $h(f_{ij}) = f_{ij} \in R^2$ and $$g(x,z) = \|x-z\|_b \quad (37)$$

is the b-norm of $x-z$ (e.g., the 2-norm, $g(x, z) = \sqrt{(x-z)^T(x-z)}$ where $x$ and $z$ are 2D vectors defining the image coordinates of two landmarks.

In AU recognition, $h(f_{ij}) = \text{sign}(f_{ij}) \in \{-1, +1\}$ and $$g(x_{ij}, x_{ik}) = \begin{cases} 1, & \text{if } x_{ij} = x_{ik} \\ 0, & \text{otherwise} \end{cases}, \quad (38)$$

where sign(.) returns $-1$ if the input number is negative and $+1$ if this number is positive or zero. $x_{ij}$ is 1 if AU $j$ is present in image $I_i$ and $-1$ if it is not present in that image. Hence, the function $h(.): R \rightarrow \{-1, +1\}$.

In some embodiments, the system takes into account the global structure of each pair of elements, i.e., each pair of landmark points in detection and each pair of AUs in recognition. That is, in detection, the system uses the information of the distance between all landmark points and, in recognition, determines where pairs of AUs co-occur (e.g. meaning that the two are simultaneously present or not present in the sample image).

In some embodiments, the global criterion can be extended to triplets. Formally, $$\mathcal{L}_{trip}(f_i, y_i) = \quad (39)$$

$$\binom{r}{3}^{-1} \sum_{1 \leq j < k < \ell \leq r} [g(h(f_{ij}), h(f_{ik}), h(f_{is})) - g(y_{ij}, y_{ik}, y_{is})]^2,$$

where $g(x, z, u)$ is now a function that computes the similarity between its three entries.

In detection, this means the system can compute the b-norm, e.g., $g(x, z, u) = \|(x-z)+(z-u)\|_b$, and the area of the triangle defined by each triplet is calculated as $$g(x, z, u) = \frac{1}{2}|(x-z) \times (x-u)|, \quad (40)$$

where the three landmark points are non-collinear.

In some embodiments, the equations can be extended to four or more points. For example, the equation can be extended to convex quadrilaterals as $g(x, z, u, v) = \frac{1}{2}|(x-u) \times (z-v)|$.

In the most general case, for $t$ landmark points, the system computes an area of the polygon envelope, i.e., a non-self-intersecting polygon contained by the $t$ landmark points $\{x_{i1}, \ldots, x_{it}\}$ the polygon is given as follows.

The system computes a Delaunay triangulation of the facial landmark points. The polygon envelop is obtained by connecting the lines of the set oft landmark points in counter-clockwise order. The ordered set of landmark points is defined as $\hat{x}_i = \{\hat{x}_{i1}, \ldots, \hat{x}_{it}\}$. The area in $\hat{x}_i$ is given by, $$g_a(\tilde{x}_i) = \frac{1}{2}\left[\left(\sum_{k=1}^{t-1} (\tilde{x}_{ik1}\tilde{x}_{i(k+1)2} - \tilde{x}_{ik2}\tilde{x}_{i(k+1)1})\right) + (\tilde{x}_{it1}\tilde{x}_{i12} - \tilde{x}_{it2}\tilde{x}_{i11})\right], \quad (41)$$

where subscript $a$ in $g_a(.)$ denotes "area." and $\tilde{x}_{ik} = (\tilde{x}_{ik1}, \tilde{x}_{ik2})^T$.

In some embodiments, the result in the above equation is obtained using Green's theorem as known in the art and, $\hat{x}_i$ can either be the $t$ outputs of DNN $\tilde{f}_i = \{\tilde{f}_{ij}, \ldots, \tilde{f}_{it}\}$ or the true values $\tilde{y}_k = \{\tilde{y}_{ij}, \ldots, \tilde{y}_{it}\}$.

The system can compute the global b-norm, $g_n(.)$, for the general case of $t$ landmark points as, $$g_n(\tilde{x}_i) = \sum_{k=1}^{t-1} \|\tilde{x}_{ik1} - \tilde{x}_{i(k+1)2}\|_b. \quad (42)$$

The above derivations define the extension of $g(.)$ to three and more points in detection problems. From this, the above can be used to recognize AUs in images.

The system computes a co-occurrence of three or more AUs in image $I_i$. Formally, $\tilde{x}_i = \{\tilde{x}_{i1}, \ldots, \tilde{x}_{it}\}$ be a set of $t$ AUs, with $\tilde{x}_{ij} \in \{-1, +1\}$, $j = 1, \ldots, t$, and $$g_{AU}(\tilde{x}_i) = \begin{cases} 1, & \text{if } \tilde{x}_{i1} = \ldots = \tilde{x}_{it} \\ 0, & \text{otherwise} \end{cases}. \quad (43)$$

GL-Loss
The final local-global (GL) loss function is given by, $$\mathcal{L}(f_i, y_i) = \alpha_0 \mathcal{L}_{local}(f_i, y_i) + \mathcal{L}_{global}(f_i, y_i), \quad (44)$$

where the global loss $\mathcal{L}_{global}$ is defined as $$\mathcal{L}_{global}(f_i, y_i) = \sum_{t=1}^{t_{max}} \alpha_t [g(h(\tilde{f}_{ij}), \ldots, h(\tilde{f}_{it})) - g(\tilde{y}_{ij}, \ldots, \tilde{y}_{it})], \quad (45)$$

g(.) is either $g_a(.)$ or $g_n(.)$ or both in detection and $g_{AU}(.)$ in recognition, and $\alpha_t$ are normalizing constants learned using cross-validation on a training set.

Backpropagation

To optimize the parameters of the DNN, w, the system computes $$\frac{\partial \mathcal{L}}{\partial w} = \alpha_0 \frac{\partial \mathcal{L}_{local}}{\partial w} + \frac{\partial \mathcal{L}_{global}}{\partial w}. \quad (46)$$

The partial derivatives of the local loss is of course given by $$\frac{\partial \mathcal{L}_{global}}{\partial w_j} = \frac{2}{r} \frac{\partial f_{ij}}{\partial w_j} (f_{ij} - y_{ij}). \quad (47)$$

The definition of the global loss uses a mapping function h(.). In some embodiments, when performing landmark detection, $h(f_{ij}) = f_{ij}$ and the partial derivatives of the global loss have the same form as those of the local loss shown in the equation above. In other embodiments, when performing AU recognition, the system uses $h(f_{ij}) = \text{sign}(f_{ij}) \in \{-1, +1\}$. The function is not differentiable, however, the system redefines it as $h(f_{ij}) = f_{ij}/\sqrt{f_{ij}^2 + \in}$, for a small $\in > 0$. The partial derivative becomes $\partial h(f_{ij})/\partial w_j = \frac{1}{2} + 1/\sqrt{f_{ij}^2 + \in}$.

Deep DNN

The system includes a deep neural network for recognition of AUs. The DNN includes two parts. The first part of the DNN is used to detect a large number of facial landmark points. The landmark points allow the system to compute GL-loss as described above.

The system can compute normalized landmark points. The system can concatenate with the output of a first fully connected layer of a second part of the DNN to embed the location information of the landmarks into the DNN used to recognize AUs. This facilitates the detection of local shape changes typically observed in the expression of emotion. This is done in the definition of the GL-loss above.

In some embodiments, the DNN includes multiple layers. In an exemplary embodiment, nine layers are dedicated to the detection of facial landmark points, and other layers are used to recognize AUs in a set of images.

The layers devoted to the detection of facial landmark points are detailed as follows.

Facial Landmark Point Detection

In the exemplary embodiment, the DNN includes three convolutional layers, two max pooling layers and two fully connected layers. The system can apply normalization, dropout, and rectified linear units (ReLU) at the end of each convolutional layer.

The weights in these layers are optimized using backpropagation—using the derived GL-loss. The global loss and the backpropagation equations are provided above.

In an example, the system uses this part of the DNN to detect a total of 66 facial landmark points. One advantage of the proposed GL-loss is that it can be efficiently trained on very large datasets. In some embodiments, the system includes a facial landmark detector that employs data augmentation to be invariant to affine transformations and partial occlusions.

The facial landmark detector generates additional images by applying two-dimensional affine transformations to the existing training set, i.e., scale, reflection, translation and rotation. In an exemplary embodiment, scale can be taken between 2 and 0.5, rotation can be −10° to 10°, and translation and reflection can be randomly generated. To make the DNN more robust to partial occlusions, the system randomizes occluding boxes of d×d pixels, with d between 0.2 and 0.4 times the inter-eye distance.

AU Recognition

The second part of the DNN combines the face appearance features with the landmark locations given by the first part of the DNN. Specifically, in the output of the first fully connected layer of the second part of the DNN, the appearance image features are concatenated with the normalized automatically detected landmark points.

Formally, let $s_i = (s_{i1}^T, \ldots, s_{ip}^T)^T$ be the vector of landmark points in the $i_{th}$ sample image (i=1, ..., n), where $s_{ik} \in R^2$ are the 2D image coordinates of the $k^{th}$ landmark, and n is the number of sample images. Thus $s_i \in R^{132}$. All images are then normalized to have the same inter-eye distance of $\tau$ pixels. That is, $\hat{s}_i = c s_i$, where $$c = \frac{\tau}{\|l - r\|_2},$$

where l and r are the image coordinates of the center of the left and right eye, $\|.\|_2$ defines the 2-norm of a vector, $\hat{s}_i = (\hat{s}_{i1}^T, \ldots, \hat{s}_{ip}^T)^T$ and can use $\tau = 200$.

The system normalizes the landmark points as $\hat{s}'_{ik} = R(\hat{s}_{ik} - \hat{l}) + \hat{l}$, where $\hat{l} = cl$, and multiplies the landmark points with a rotation matrix R to make the outer corner of left and right eye match a horizontal line. The system rescales and shifts the values $\hat{s}'_i$ to move the outer corner of the left and right eye in an image to the pre-determined positions of (0.5, 0) and (−0.5, 0), respectively.

In one embodiment, the DNN is similarly to that of GoogleNet but with the major difference that the herein defined GL-loss is used. The input of the DNN can be a face image. The system changes the size of the filter in the first layer to adapt to the input, and randomly initializes the weight for these filters. In order to embed landmarks in the DNN, the number of filters in the first fully connected layer can be changed as well as the number of filters for output as the number of AUs. The system can employ a single DNN can be employed to detect all AUs in images of facial expressions.

The weights of the second part of the DNN can be optimized using backpropagation methods and with the global loss defined above.

In some embodiments, the data augmentation can be performed by adding random noise to 2D landmark points, and applying the affine transformations described above.

In some embodiments, the system can be trained to initialize recognition of AUs in the wild using a training database as described above.

Figure 7:
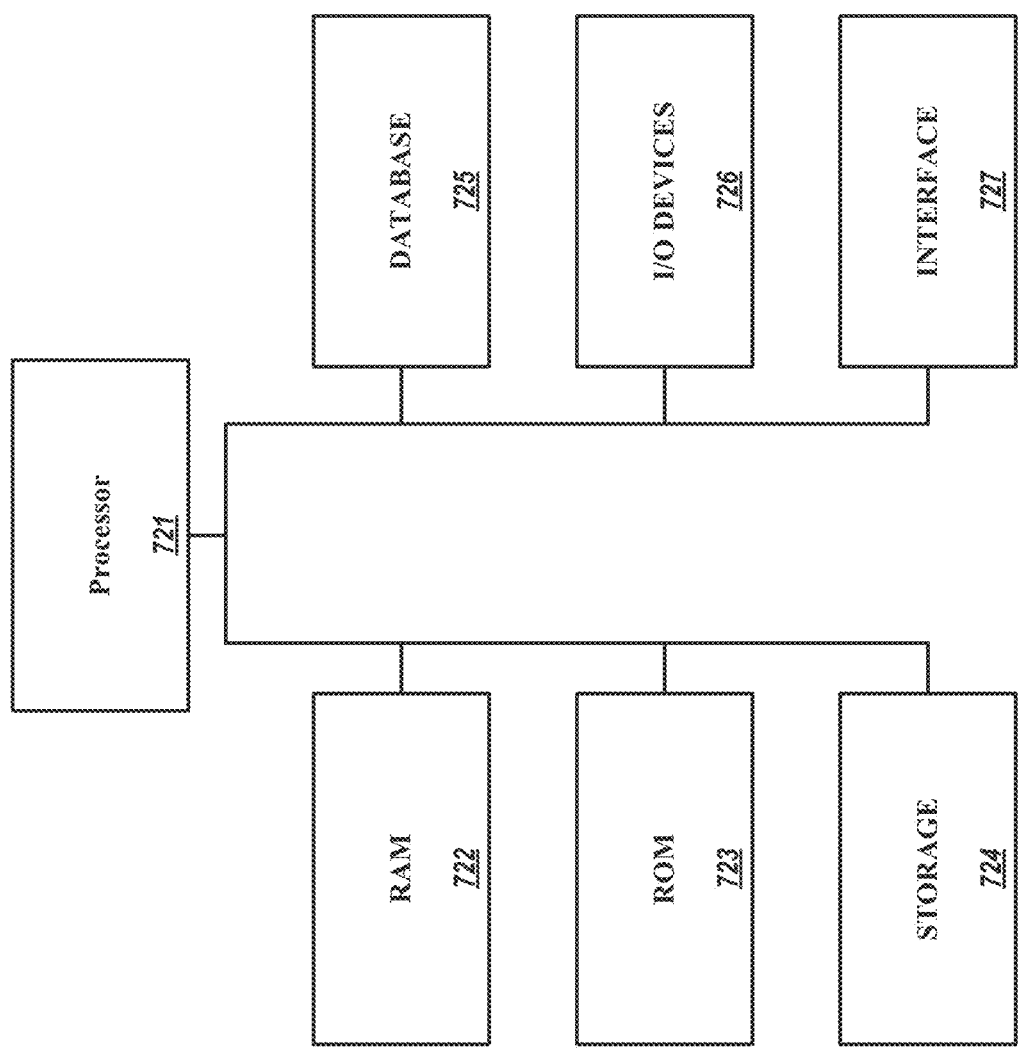
FIG. 7 illustrates a network system for detecting AUs using deep neural networks in video and/or still images

FIG. 7 illustrates a network system 700 for detecting AUs and emotion categories using deep neural networks (DNN)

in video and/or still images. The system 700 includes an image database component 710 having a set of videos and/or images. The system 700 includes a DNN 720 that determines AUs in the set of images of the image database 710. The DNN 720 includes a first part 730 that defines landmarks in the set of images as described above. The DNN 720 includes a second part 740 that determines AUs in the landmarks in the set of images in the database component 710 as described above. The system 700 includes a tagging component 750 that tags the images with at least one AU or no AU. The system 700 can store the tagged images in a processed image database 760.

Example Computing Device

Figure 8:
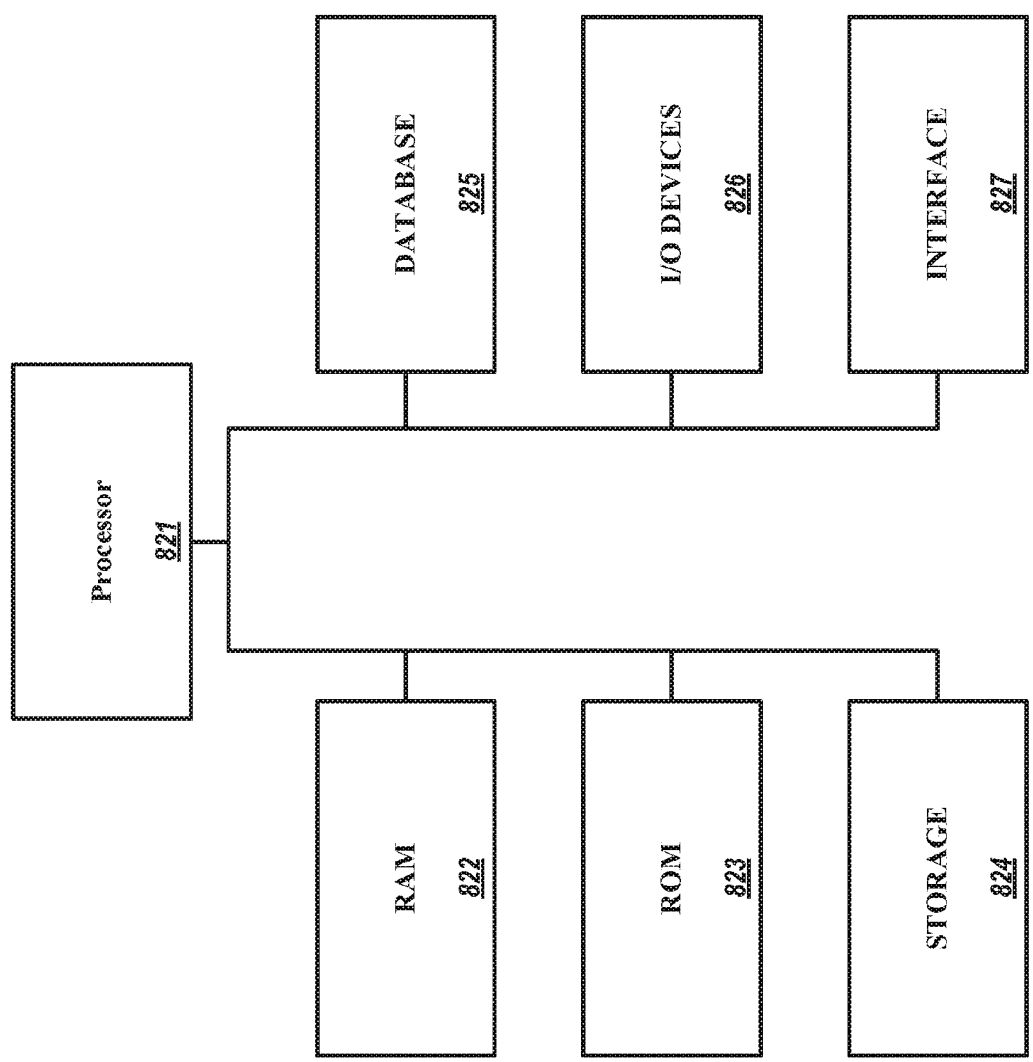
FIG. 8 shows an example computer system.

FIG. 8 illustrates an exemplary computer that can be used for configuring hardware devices in an industrial automation system. In various aspects, the computer of FIG. 8 may comprise all or a portion of the development workspace 100, as described herein. As used herein, "computer" may include a plurality of computers. The computers may include one or more hardware components such as, for example, a processor 821, a random access memory (RAM) module 822, a read-only memory (ROM) module 823, a storage 824, a database 825, one or more input/output (I/O) devices 826, and an interface 827. Alternatively and/or additionally, controller 820 may include one or more software components such as, for example, a computer-readable medium including computer executable instructions for performing a method associated with the exemplary embodiments. It is contemplated that one or more of the hardware components listed above may be implemented using software. For example, storage 824 may include a software partition associated with one or more other hardware components. It is understood that the components listed above are exemplary only and not intended to be limiting.

Processor 821 may include one or more processors, each configured to execute instructions and process data to perform one or more functions associated with a computer for indexing images. Processor 821 may be communicatively coupled to RAM 822. ROM 823, storage 824, database 825, I/O devices 826, and interface 827. Processor 821 may be configured to execute sequences of computer program instructions to perform various processes. The computer program instructions may be loaded into RAM 822 for execution by processor 821. As used herein, processor refers to a physical hardware device that executes encoded instructions for performing functions on inputs and creating outputs.

RAM 822 and ROM 823 may each include one or more devices for storing information associated with operation of processor 821. For example, ROM 823 may include a memory device configured to access and store information associated with controller 820, including information for identifying, initializing, and monitoring the operation of one or more components and subsystems. RAM 822 may include a memory device for storing data associated with one or more operations of processor 821. For example, ROM 823 may load instructions into RAM 822 for execution by processor 821.

Storage 824 may include any type of mass storage device configured to store information that processor 821 may need to perform processes consistent with the disclosed embodiments. For example, storage 824 may include one or more magnetic and/or optical disk devices, such as hard drives, CD-ROMs, DVD-ROMs, or any other type of mass media device.

Database 825 may include one or more software and/or hardware components that cooperate to store, organize, sort, filter, and/or arrange data used by controller 820 and/or processor 821. For example, database 825 may store hardware and/or software configuration data associated with input-output hardware devices and controllers, as described herein. It is contemplated that database 825 may store additional and/or different information than that listed above.

I/O devices 826 may include one or more components configured to communicate information with a user associated with controller 820. For example, I/O devices may include a console with an integrated keyboard and mouse to allow a user to maintain a database of images, update associations, and access digital content. I/O devices 826 may also include a display including a graphical user interface (GUI) for outputting information on a monitor. I/O devices 826 may also include peripheral devices such as, for example, a printer for printing information associated with controller 820, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 827 may include one or more components configured to transmit and receive data via a communication network, such as the Internet, a local area network, a workstation peer-to-peer network, a direct link network, a wireless network, or any other suitable communication platform. For example, interface 727 may include one or more modulators, demodulators, multiplexers, de-multiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow: plain meaning derived from grammatical organization or punctuation; the number or type of embodiments described in the specification. Throughout this application, various publications may be referenced. The disclosures of these publications in their entireties are hereby incorporated by reference into this application in order to more fully describe the state of the art to which the methods and systems pertain. It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for analyzing an image comprising:

maintaining a plurality of kernel spaces of configural, shape and shading features, wherein each kernel space is non-linearly separable to other kernel space, and wherein each kernel space is associated with one or more action units (AUs) and one or more AU intensity values;

receiving, by a computing system, a plurality of images to be analyzed; and for each received image:
determining face space data of configural (including shape), and shading features of a face in the image, wherein a face space includes, a configural feature vector and a shading feature vector associated with shading changes in the face; and determining none, one or more AU values for the image by comparing the determined face space data of configural feature to the plurality of kernel spaces to determine presence of the determined face space data of configural and shading features, wherein the image features comprises:
landmark points derived using a deep neural network comprising a global-local (GL) loss function, and
image features to identify AUs, AU intensities, emotion categories and their intensities derived using the deep neural network comprising a global-local (GL) loss function that is configured to backpropagate both local and global fit of landmark points projected over the image.

2. The method of claim 1, comprising:
processing, in real-time, a video stream comprising a plurality of images to determine AU values and AU intensity values for each of the plurality of images.

3. The method of claim 1, wherein the determined face space data of the configural features comprises distance and angle values between normalized landmarks in Delaunay triangles formed from the image and angles defined by each of the Delaunay triangles corresponding to the normalized landmark.

4. The method of claim 1, wherein the shading feature vector associated with shading changes in the face are determined by:
applying Gabor filters to normalized landmark points determined from the face.

5. The method of claim 1, wherein the AU value and AU intensity value, collectively, define an emotion and an emotion intensity.

6. The method of claim 1, wherein the image comprises a photograph.

7. The method of claim 1, wherein the image comprises a frame of a video sequence.

8. The method of claim 1, wherein the computing system uses a video sequence from a controlled environment or an uncontrolled environment.

9. The method of claim 1, wherein the computing system uses black and white images or color images.

10. The method of claim 1, comprising:
receiving an image; and
processing the received image to determine an AU value and an AU intensity value for a face in the received image.

11. The method of claim 1, comprising:
receiving a first plurality of images from a first database;
receiving a second plurality of images from a second database; and
processing the received first plurality and second plurality of images to determine for each image thereof an AU value and an AU intensity value for a face in each respective image, wherein the first plurality of images has a first captured configuration and the second plurality of images has a second captured configuration, wherein the first captured configuration is different form the second captured configuration.

12. The method of claim 1, comprising:
performing kernel subclass discriminant analysis (KSDA) on the face space; and
recognizing AU and AU intensities, emotion categories, and emotion intensities based on the KSDA.

* * * * *